(12) United States Patent
Honma et al.

(10) Patent No.: US 8,436,874 B2
(45) Date of Patent: May 7, 2013

(54) ITEM EDITING METHOD, ITEM EDITING DEVICE, AND PROGRAM

(75) Inventors: Masakazu Honma, Nagano-ken (JP); Junichi Otsuka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1306 days.

(21) Appl. No.: 11/952,320

(22) Filed: Dec. 7, 2007

(65) Prior Publication Data
US 2008/0136823 A1 Jun. 12, 2008

(30) Foreign Application Priority Data

Dec. 8, 2006 (JP) .................................. 2006331345
Dec. 8, 2006 (JP) .................................. 2006331346

(51) Int. Cl.
*G09G 5/00* (2006.01)
*G06T 11/20* (2006.01)

(52) U.S. Cl.
USPC ............ 345/646; 345/441; 345/442; 345/619

(58) Field of Classification Search .................. 345/441, 345/442, 619, 646
See application file for complete search history.

(56) References Cited

U.S. PATENT DOCUMENTS

| | | | |
|---|---|---|---|
| 5,539,868 A | 7/1996 | Hosaya et al. | |
| 5,724,072 A * | 3/1998 | Freeman et al. | 345/648 |
| 5,852,447 A | 12/1998 | Hosoya et al. | |
| 6,608,631 B1 * | 8/2003 | Milliron | 345/647 |
| 7,769,222 B2 * | 8/2010 | Blanford et al. | 382/141 |
| 2004/0263533 A1 * | 12/2004 | Yamamoto et al. | 345/619 |
| 2007/0136664 A1 * | 6/2007 | Brown et al. | 715/531 |

FOREIGN PATENT DOCUMENTS

| | | |
|---|---|---|
| JP | 04-127219 A | 4/1992 |
| JP | 5127654 | 5/1993 |
| JP | 06-118940 A | 4/1994 |
| JP | 06203135 | 7/1994 |
| JP | 07273967 | 10/1995 |
| JP | 2002058649 | 2/2002 |
| JP | 2006-023960 A | 1/2006 |

OTHER PUBLICATIONS

Sotoma, K., et al., Super Reference for Windows, Flash 5, Aug. 13, 2009, English translation.
Cease, "Technique Bible Flash MX 2004", Dec. 16, 2002, English translation.
Hamano, T., "Wake up Sleeping XP, Transform VHS to DVD at High Quality", 2004, English Translation.

* cited by examiner

*Primary Examiner* — Jeffrey Chow

(57) ABSTRACT

An item editing device, and item editing method, and a program stored on a tangible media enable easily editing items whether the item is rectangle or an arch shape by unifying the item editing operation and reducing the number of steps. The item editing method enables editing an editable item within a layout area via an item changing unit where prescribed areas are set as attributes of the item in the top side, the bottom side, the left side, the right side, the center point, and an internal area other than the center point of the item, and has steps of: specifying one of the prescribed areas of the editable item when editing the item; specifying any point in the layout area as a destination of the specified item; and selecting one of the editing units included in the item changing unit according to the specified point and editing the editable item within the layout area, the editing unit including an arch-shape generating unit, an item curvature changing unit, an item width changing unit, an item height changing unit, and an item position changing unit.

7 Claims, 10 Drawing Sheets

ITEM EDITING METHOD, ITEM EDITING DEVICE, AND PROGRAM

CROSS-REFERENCE TO RELATED APPLICATIONS

Japanese Patent application Nos. 2006-331345 and 2006-331346, are hereby incorporated by reference in their entirety.

BACKGROUND

1. Field of Invention

The present invention relates to an item editing method, an item editing device, and a program. More particularly, the invention relates to an item editing method, an item editing device, and a program for editing text strings and other items that are printed on the label surface of optical recording media such as DVD and CD media according to the shape of the label surface.

2. Description of the Related Art

Demand has risen for centrally managing recording data on optical recording media such as CDs and DVDs in order to ensure the confidentiality of personal information and corporate secrets, for example. Demand for producing or dubbing relatively small quantities, such as approximately 10 to 100, optical recording media for distribution at trade shows or on the street is also growing.

To meet these needs, disc-publishing devices that record digital data, image data, or music data, for example, at high speed on optical recording media and then print the disc content on the label surface have been introduced.

An example of a recording medium production device for business applications is the recording medium production device taught in Japanese Unexamined Patent Appl. Pub. JP-A-2002-58649 that has a disc holder for stocking blank CDs, a CD recording unit, a label printer unit, and a recorded CD holder, and is used for recording medical images on optical recording media and printing an identification label on the label side.

It may also be desirable to edit the shape of an item such as a block of text (also referred to as a "text block") that is printed on the label surface to form an arch shape that conforms to the shape of the printing surface (the label surface) of the CD or DVD disc.

An "arch shape" as used herein is a general term for the shape of a closed area that is formed by two arcs and two line segments and divides two concentric circles of two radii with one straight line or two straight lines, or a fan shape.

The "shape of an item" is the shape of the printable area of one item.

However, when the shape or central angle of an arch-shaped item is changed, or the layout position of an arch-shaped item is changed, a different editing operation is required than when changing the angle of rotation or the shape of a rectangular item or changing the layout position of a rectangular item. In other words, there was no operation enabling the operator to change the shape of the item, or there were operations that could be used when the item is rectangular but not when the item is arch-shaped.

Depending on whether the shape of the item is a rectangle or an arch, the operator must therefore change the method of editing the item, or change the item to a rectangle, edit the item, and then return the item to an arch shape.

Another problem is that when changing the shape of an item by an editing operation, the shape of the item may differ from the shape intended by the operator after the change is made.

SUMMARY OF THE INVENTION

The item editing device, the item editing method, and the program of the invention enable easily editing an item by affording a common item editing operation and reducing the number of operating steps regardless of whether the text block or other item printed on the label surface of the DVD, CD, or other optical recording medium is a rectangle or an arch.

An item editing method for editing an editable item within a layout area via an item changing unit where prescribed areas of the top side, the bottom side, the left side, the right side, the center point, and an internal area other than the center point of the item are set as attributes of the item, the item editing method having steps including: specifying one of the prescribed areas of the editable item when editing the item; specifying any point in the layout area as a destination of the specified item; and selecting one of a plurality of editing units included in the item changing unit according to the specified point and editing the editable item within the layout area, the editing units including an arch-shape generating unit, an item curvature changing unit, an item width changing unit, an item height changing unit, and an item position changing unit.

The arch-shape generating unit is a unit that changes a rectangular item that is the editable item to an arch-shaped item by specifying a center point definition area in the rectangular item and then specifying a separate point.

The item curvature changing unit is a unit that changes the curvature of an editable item by specifying a center point definition area in the item and then specifying a separate point.

The item width changing unit is a unit that changes the width of an editable item by specifying a width definition area on the left side or the right side of the item and then specifying a separate point.

The item height changing unit is a unit that changes the height of an editable item by specifying a height definition area on the top side or the bottom side of the item and then specifying a separate point.

The item position changing unit is a unit that changes the position of an editable item by specifying a prescribed area other than the center point inside the item and then specifying a separate point.

Another aspect of the invention is an item editing method for editing an editable item within a layout area that is a circle or a part of a circle via an item changing unit where prescribed areas of the top side, the bottom side, the left side, the right side, the center point, and inside other than the center point of the item are set as attributes of the item. The item editing method has steps of: setting the center of the circle or the part of the circle as a reference point for editing; specifying one of the prescribed areas of the editable item when editing the item; specifying any point in the layout area as a destination of the specified item; and selecting one of a plurality of editing units included in the item changing unit according to the specified point and editing the editable item within the layout area, the editing units including an arch-shape generating unit, an item curvature changing unit, an item width changing unit, an item height changing unit, and an item position changing unit.

The arch-shape generating unit is a unit that changes a rectangular item to an arch-shaped item centered on the reference point by specifying a center point definition area of a rectangular item that is the editable item and then specifying a separate point.

The item curvature changing unit is a unit that changes the curvature of an arch-shaped item that is the editable item centered on the reference point by specifying a center point definition area that is the center of the arch-shaped item and then specifying a separate point.

The item width changing unit is a unit that changes the width of an editable arch-shaped item centered on the reference point by specifying a prescribed area on the left side or the right side of the editable arch-shaped item and then specifying a separate point.

The item height changing unit is a unit that changes the height of an editable arch-shaped item centered on the reference point by specifying a prescribed area on the top side or the bottom side of the editable item and then specifying a separate point.

The item position changing unit is a unit that changes the position of an editable arch-shaped item centered on the reference point by specifying a prescribed area other than the center point of the arch-shaped item and then specifying a separate point.

Another aspect of the invention is an item editing device for editing an editable item within a layout area where prescribed areas of the top side, the bottom side, the left side, the right side, the center point, and inside other than the center point of the item are set as attributes of the item. The item editing device specifies one of the prescribed areas of the editable item when editing the item and then specifying any point in the layout area as a destination of the specified item, selects generating an arch shape, changing the item curvature, changing the item width, changing the item height, or changing the item position according to the specified prescribed area, and moves the editable item to the destination.

Another aspect of the invention is an item editing device for editing an editable item within a layout area by unit an item changing unit where prescribed areas of the top side, the bottom side, the left side, the right side, the center point, and inside other than the center point of the item are set as attributes of the item, the item editing device having a movement point selection unit that specifies one of the prescribed areas of the editable item when editing the item and then specifies any point in the layout area as a destination of the specified item; and an item moving unit that selects one of a plurality of editing units included in the item changing unit according to the specified prescribed area and moves the editable item to the destination, the editing units including an arch-shape generating unit, an item curvature changing unit, an item width changing unit, an item height changing unit, and an item position changing unit.

The arch-shape generating unit is a unit that changes a rectangular item that is the editable item to an arch-shaped item by specifying a center point definition area in the center of the rectangular item and then specifying a separate point.

The item curvature changing unit is a unit that changes the curvature of an editable item by specifying a center point definition area in the item and then specifying a separate point.

The item width changing unit is a unit that changes the width of an editable item by specifying a width definition area on the left side or the right side of the item and then specifying a separate point.

The item height changing unit is a unit that changes the height of an editable item by specifying a height definition area on the top side or the bottom side of the item and then specifying a separate point.

The item position changing unit is a unit that changes the position of an editable item by specifying a prescribed area other than the center point inside the item and then specifying a separate point.

Another aspect of the invention is an item editing device for editing an editable item within a layout area that is a circle or a part of a circle via an item changing unit where prescribed points on the top side, the bottom side, the left side, and the right side, of the item, the center point and an internal prescribed point other than the center point of the item are set as attributes of the item, the item editing device having: a reference point setting unit that sets the center of the circle or the part of the circle as a reference point for editing; a movement point selection unit that specifies one of the prescribed areas of the editable item when editing the item, and then specifies any point in the layout area as a destination of the editable item; and an item moving unit that selects one of a plurality of editing units included in the item changing unit according to the specified point and edits the editable item centered on the reference point, the editing units including an arch-shape generating unit, an item curvature changing unit, an item width changing unit, an item height changing unit, and an item position changing unit.

The arch-shape generating unit is a unit that changes an editable rectangular item to an arch-shaped item centered on the reference point.

The item curvature changing unit is a unit that changes the curvature of an arch-shaped item that is the editable item centered on the reference point by specifying a center point definition area of the arch-shaped item and then specifying a separate point.

The item width changing unit is a unit that changes the width of an editable arch-shaped item centered on the reference point by specifying a width definition area on the left side or the right side of the editable arch-shaped item and then specifying a separate point.

The item height changing unit is a unit that changes the height of an editable arch-shaped item centered on the reference point by specifying a height definition area on the top side or the bottom side of the editable item and then specifying a separate point.

The item position changing unit is a unit that changes the position of an editable arch-shaped item centered on the reference point by specifying a prescribed area other than the center point inside the arch-shaped item and then specifying a separate point.

In another aspect of the invention, a tangible computer-readable media embodying instructions executable by a computer is provided, the media having instructions that cause a computer to execute a process of editing an editable item within a layout area using an item changing unit according to the methods set forth in the preceding paragraphs.

With this aspect of the invention, when the computer reads the program and executes the process according to the read program, the same effect as the item editing device according to the invention can be achieved.

A first aspect of an item editing device according to the present invention is described below.

(1) The item editing device for editing items defines as an arch shape (A) a closed area formed by two line segments and two arcs that are sections of two concentric circles that have different radii and are segmented by two straight radial lines, or (B) a fan shape formed by two line segments and one arc that is a section of one circle segmented by two straight radial lines. In addition, a prescribed area containing a width definition point is a width definition area, a prescribed area containing a height definition point is a height definition area, and a prescribed area containing a center point is a center point area.

Based on attribute information for an item that is a rectangle having vertical and horizontal dimensions, an arch-shape generating unit generates attribute information for an arch-shaped item by moving only a first movement point, which is one point inside the center point area of the item, to a point at a different position.

Based on attribute information for an arch-shaped item, an item curvature changing unit generates attribute information for an arch-shaped item that has different curvature after editing than before editing by moving a second movement point that is one point inside the center point area of the item to a point at a different position.

Based on attribute information for an arch-shaped item, an item width changing unit generates attribute information for an arch-shaped item that has a different width after editing than before editing by moving a third movement point that is one point in either one of two width definition areas of the area to a point at a different position.

Based on attribute information for an arch-shaped item, an item height changing unit generates attribute information for an arch-shaped item that has a different height after editing than before editing by moving a fourth movement point that is one point in either one of two height definition areas of the area to a point at a different position.

Based on attribute information for an arch-shaped item, an item position changing unit generates attribute information for an arch-shaped item at a position that is different after editing than before editing by moving only a fifth movement point that is one point inside an area of the item other than the center point area of the item, the two width definition areas, and the two height definition areas to a point at a different position.

The arch-shape generating unit generates the attribute information of the arch-shaped item having vertical and horizontal dimensions so that the top side and the bottom side of the rectangle become the two arcs of the arch shape, and the left side and the right side of the rectangle become the two line segments of the arch shape if the item after editing is an arch shape having the shape of the above-described closed area.

Furthermore, if the item after editing is the above-described fan shape, the top side or the bottom side of the rectangle becomes the single arc of the arch shape, and the left side and the right side of the rectangle become the two line segments of the arch shape.

The intersection of the diagonals of the rectangle is the center point of the rectangle. The length of the left side and the right side of the rectangle is the height of the rectangle, and the midpoints of the left side and right side of the rectangle are the width definition points of the rectangle. The straight line through the height definition points and the center point of the rectangle is the width center line of the rectangle.

The length of the top side and the bottom side of the rectangle is the width of the rectangle, and the midpoints of the top side and bottom side of the rectangle are the height definition points of the rectangle. The line through the width definition points and the center point is the height center line of the rectangle.

Prescribed areas containing the width definition points are the width definition areas, prescribed areas containing the height definition points are the height definition areas, and a prescribed area containing the center point is the center point area.

The shape, rotation angle, and position of an item can therefore be changed when the item is an arch shape using the same editing operation as when the item is a rectangle. More specifically, the same operation can be used to edit a rectangular item and to edit an arch-shaped item.

A single operating procedure can also change at least any one of the shape, position, or angle of rotation in one direction of the item, or the shape of the item (rectangular or arch-shaped). The operator can therefore easily edit an item.

For example, when the operator uses a mouse to change the layout position of an arch-shaped item, the operator can change the layout position of the item in the same way as when the item is a rectangle by simply moving a point in the area of the item before the item is edited to the position desired after the item is changed.

(2) The arch-shape generating unit generates an arch-shaped item by generating the attribute information of the arch-shaped item so that the positions of the two width definition points of the rectangular item before the item shape is changed ("before editing") are the positions of the width definition points of the arch-shaped item after the item shape is changed ("after editing"); the height of the rectangular item before editing and the height of the arch-shaped item after editing are the same; and the position of the midpoint of the arch-shaped item after editing is the position on the width center line of the rectangular item before editing that is offset from the center point of the rectangular item before editing by the distance from a line segment connecting the two width definition points of the rectangular item before editing to the first movement point after being moved.

A rectangular item can therefore be changed to an arch-shaped item.

The shape of the item can also be changed to a shape close to the shape intended by the operator after the item is changed.

(3) The item curvature changing unit generates an arch-shaped item that has a different curvature after editing than before editing by generating the attribute information of the arch-shaped item so that the positions of the two width definition points of the arch-shaped item before editing are the positions of the width definition points of the arch-shaped item after editing; the height of the arch-shaped item before editing and the height of the arch-shaped item after editing are the same; and the position of the midpoint of the arch-shaped item after editing is offset from the midpoint of the arch-shaped item before editing on the width center line of the arch-shaped item before editing by the distance from a straight line that is parallel to a line segment connecting the two width definition points of the arch-shaped item before editing and passes through the midpoint of the arch-shaped item before editing to the second movement point after being moved.

An item that is arch shaped before editing can thus be changed to an arch-shaped item of a different curvature after being edited. The shape of the item can also be changed to a shape close to the shape intended by the operator after the item is changed.

(4) In an item editing device according to another aspect of the invention, the item is a rectangle after being edited when the curvature of the arch-shaped item after editing is zero.

This enables changing an item that is arch shaped before editing to an item that is a rectangle after editing.

(5) The item width changing unit generates an arch-shaped item that is a different width after editing than before editing by generating the attribute information of the arch-shaped item so that when the closer of the two width definition points of the arch-shaped item before editing to the third movement point is a first width definition point and the farther point is a second width definition point, the height of the arch-shaped item before editing and the height of the arch-shaped item after editing are the same; the curvature of the arch-shaped item before editing and the curvature of the arch-shaped item after editing are the same; and the positions of the two width definition points of the arch-shaped item after editing are the position of the second width definition point of the arch-shaped item before editing and the third movement point after being moved.

An item of an arch shape before editing can thus be changed to an arch-shaped item of a different width after editing.

The shape of the item can also be changed to a shape close to the shape and angle of rotation intended by the operator after the item is changed.

(6) The item height changing unit generates an arch-shaped item that is a different height after editing than before editing by generating the attribute information of the arch-shaped item so that when the closer of the two height definition points of the arch-shaped item before editing to the fourth movement point is a first height definition point and the farther point is a second height definition point, the position of the center point of the arch-shaped item before editing is the position of the center point of the arch-shaped item after editing are the same; the height of the arch-shaped item after editing is the height of the arch-shaped item before editing changed by the difference between the distance from the fourth movement point before movement to the center point of the arch shape and the distance from the fourth movement point after movement to the center point of the arch shape; the two line segments of the arch-shaped item after editing are extensions of the two line segments of the arch-shaped item before editing; and the second height definition point or the arc on which the second height definition point is located in the arch-shaped item before editing is the second height definition point or one arc of the arch-shaped item after editing.

An item of an arch shape before editing can thus be changed to an arch-shaped item of a different height after editing.

The shape of the item can also be changed to a shape close to the shape intended by the operator after the item is changed.

(7) The item height changing unit generates an arch-shaped item that is a different height after editing than before editing by generating the attribute information of the arch-shaped item so that when the closer of the two height definition points of the arch-shaped item before editing to the fourth movement point is a first height definition point and the farther point is a second height definition point, the position of the center point of the arch-shaped item before editing is the position of the center point of the arch-shaped item after editing are the same; the height of the arch-shaped item after editing is the height of the arch-shaped item before editing changed by the distance from a straight line that is parallel to a line segment connecting the two width definition points of the item before editing and passes through the fourth movement point before movement to the fourth movement point after movement; the two line segments of the arch-shaped item after editing are extensions of the two line segments of the arch-shaped item before editing, and the second height definition point or the arc on which the second height definition point is located in the arch-shaped item before editing is the second height definition point or one arc of the arch-shaped item after editing.

An item of an arch shape before editing can thus be changed to an arch-shaped item of a different height after editing.

The shape of the item can also be changed to a shape close to the shape intended by the operator after the item is changed.

(8) The item position changing unit generates an arch-shaped item of a different position after editing than before editing by generating the attribute information of the arch-shaped item so that the width of the arch-shaped item before editing and the width of the arch-shaped item after editing are the same, the height of the arch-shaped item before editing and the height of the arch-shaped item before editing are the same; the curvature of the arch-shaped item before editing and the curvature of the arch-shaped item before editing are the same; and the positions of the two width definition points, the positions of the two height definition points, and the center point of the arch-shaped item after editing are displaced parallel to a line segment connecting the fifth movement point before movement and the fifth movement point after movement from the positions of the two width definition points, the positions of the two height definition points, and the center point of the arch-shaped item before editing by the distance from the fifth movement point before movement to the fifth movement point after movement.

An item of an arch shape before editing can thus be changed to an arch-shaped item of a different position after editing.

The position of the item can also be changed to a position close to the position intended by the operator after the item is changed.

A first aspect of an item editing method according to the present invention is described next.

(9) The item editing method for editing items defines as an arch shape (A) a closed area formed by two line segments and two arcs that are sections of two concentric circles that have different radii and are segmented by two straight radial lines, or (B) a fan shape formed by two line segments and one arc that is a section of one circle segmented by two straight radial lines. In addition, a prescribed area containing a width definition point is a width definition area, a prescribed area containing a height definition point is a height definition area, and a prescribed area containing a center point is a center point area.

(a) Based on attribute information for an item that is a rectangle having vertical and horizontal dimensions, an arch-shape generating step generates attribute information for an arch-shaped item by moving only a first movement point, which is one point inside the center point area of the item, to a point at a different position.

(b) Based on attribute information for an arch-shaped item, an item curvature changing step generates attribute information for an arch-shaped item that has different curvature after editing than before editing by moving a second movement point that is one point inside the center point area of the item to a point at a different position.

(c) Based on attribute information for an arch-shaped item, an item width changing step generates attribute information for an arch-shaped item that has a different width after editing than before editing by moving a third movement point that is one point in either one of two width definition areas of the area to a point at a different position.

(d) Based on attribute information for an arch-shaped item, an item height changing step generates attribute information for an arch-shaped item that has a different height after editing than before editing by moving a fourth movement point that is one point in either one of two height definition areas of the area to a point at a different position.

(e) Based on attribute information for an arch-shaped item, an item position changing step generates attribute information for an arch-shaped item at a position that is different after editing than before editing by moving only a fifth movement point that is one point inside an area of the item other than the center point area of the item, the two width definition areas, and the two height definition areas to a point at a different position.

The (a) arch-shape generating step generates the attribute information of the arch-shaped item having vertical and horizontal dimensions so that the top side and the bottom side of the rectangle become the two arcs of the arch shape, and the left side and the right side of the rectangle become the two line segments of the arch shape if the item after editing is an arch shape having the shape of the above-described closed area.

Furthermore, if the item after editing is the above-described fan shape, the top side or the bottom side of the rectangle becomes the single arc of the arch shape, and the left side and the right side of the rectangle become the two line segments of the arch shape.

This aspect of the invention achieves the same effect as the item editing device described above.

(10) The (a) arch-shape generating step generates an arch-shaped item by generating the attribute information of the arch-shaped item so that the positions of the two width definition points of the rectangular item before editing are the positions of the width definition points of the arch-shaped item after editing; the height of the rectangular item before editing and the height of the arch-shaped item after editing are the same; and the position of the midpoint of the arch-shaped item after editing is the position on the width center line of the rectangular item before editing that is offset from the center point of the rectangular item before editing by the distance from a line segment connecting the two width definition points of the rectangular item before editing to the first movement point after being moved.

This aspect of the invention achieves the same effect as the item editing device described above.

(11) The (b) item curvature changing step generates an arch-shaped item that has a different curvature after editing than before editing by generating the attribute information of the arch-shaped item so that the positions of the two width definition points of the arch-shaped item before editing are the positions of the width definition points of the arch-shaped item after editing; the height of the arch-shaped item before editing and the height of the arch-shaped item after editing are the same; and the position of the midpoint of the arch-shaped item after editing is offset from the midpoint of the arch-shaped item before editing on the width center line of the arch-shaped item before editing by the distance from a straight line that is parallel to a line segment connecting the two width definition points of the arch-shaped item before editing and passes through the midpoint of the arch-shaped item before editing to the second movement point after being moved.

This aspect of the invention achieves the same effect as the item editing device described above.

(12) In an item editing method according to another aspect of the invention, the item is a rectangle after being edited when the curvature of the arch-shaped item after editing is zero.

This aspect of the invention achieves the same effect as the item editing device described above.

(13) The (c) item width changing step generates an arch-shaped item that is a different width after editing than before editing by generating the attribute information of the arch-shaped item so that when the closer of the two width definition points of the arch-shaped item before editing to the third movement point is a first width definition point and the farther point is a second width definition point, the height of the arch-shaped item before editing and the height of the arch-shaped item after editing are the same; the curvature of the arch-shaped item before editing and the curvature of the arch-shaped item after editing are the same; and the positions of the two width definition points of the arch-shaped item after editing are the position of the second width definition point of the arch-shaped item before editing and the third movement point after being moved.

This aspect of the invention achieves the same effect as the item editing device described above.

(14) The (d) item height changing step generates an arch-shaped item that is a different height after editing than before editing by generating the attribute information of the arch-shaped item so that when the closer of the two height definition points of the arch-shaped item before editing to the fourth movement point is a first height definition point and the farther point is a second height definition point, the position of the center point of the arch-shaped item before editing is the position of the center point of the arch-shaped item after editing are the same; the height of the arch-shaped item after editing is the height of the arch-shaped item before editing changed by the difference between the distance from the fourth movement point before movement to the center point of the arch shape and the distance from the fourth movement point after movement to the center point of the arch shape; the two line segments of the arch-shaped item after editing are extensions of the two line segments of the arch-shaped item before editing; and the second height definition point or the arc on which the second height definition point is located in the arch-shaped item before editing is the second height definition point or one arc of the arch-shaped item after editing.

This aspect of the invention achieves the same effect as the item editing device described above.

(15) The (d) item height changing unit generates an arch-shaped item that is a different height after editing than before editing by generating the attribute information of the arch-shaped item so that when the closer of the two height definition points of the arch-shaped item before editing to the fourth movement point is a first height definition point and the farther point is a second height definition point, the position of the center point of the arch-shaped item before editing is the position of the center point of the arch-shaped item after editing are the same; the height of the arch-shaped item after editing is the height of the arch-shaped item before editing changed by the distance from a straight line that is parallel to a line segment connecting the two width definition points of the item before editing and passes through the fourth movement point before movement to the fourth movement point after movement; the two line segments of the arch-shaped item after editing are extensions of the two line segments of the arch-shaped item before editing, and the second height definition point or the arc on which the second height definition point is located in the arch-shaped item before editing is the second height definition point or one arc of the arch-shaped item after editing.

This aspect of the invention achieves the same effect as the item editing device described above.

(16) The (e) item position changing step generates an arch-shaped item of a different position after editing than before editing by generating the attribute information of the arch-shaped item so that the width of the arch-shaped item before editing and the width of the arch-shaped item after editing are the same, the height of the arch-shaped item before editing and the height of the arch-shaped item before editing are the same; the curvature of the arch-shaped item before editing and the curvature of the arch-shaped item before editing are the same; and the positions of the two width definition points, the positions of the two height definition points, and the center point of the arch-shaped item after editing are displaced parallel to a line segment connecting the fifth movement point before movement and the fifth movement point after movement from the positions of the two width definition points, the positions of the two height definition points, and the center point of the arch-shaped item before editing by the distance from the fifth movement point before movement to the fifth movement point after movement.

This aspect of the invention achieves the same effect as the item editing device described above.

A second aspect of an item editing device according to the present invention is described next.

(17) The item editing device for editing items is an item editing device for editing items that are positioned on a circular or donut-shaped layout area formed by two concentric circles of different radii. The item editing device defines as an arch shape (A) a closed area formed by two line segments and two arcs that are sections of two concentric circles that have different radii and are segmented by two straight radial lines, or (B) a fan shape formed by two line segments and one arc that is a section of one circle segmented by two straight radial lines. In addition, a prescribed area containing a width definition point is a width definition area, and a prescribed area containing a height definition point is a height definition area.

A layout area center setting unit sets for each item as an attribute contained in the attribute information of the item whether to use the center point of the layout area as the center point of the arch shape.

Based on attribute information for an item that is a rectangle having vertical and horizontal dimensions, an arch-shape generating unit generates attribute information for an arch-shaped item so that the midpoint of the item remains stationary while the center point of the arch shape is set to the center point of the layout area when the layout area center setting unit sets the item so that the center point of the arch shape is the center point of the layout area.

When the item is set by the layout area center setting unit so that the center point of the arch shape is the center point of the layout area based on the attribute information of the arch-shaped item, an item curvature changing unit generates attribute information for an arch-shaped item that has different curvature after editing than before editing while holding the midpoint of the item stationary and setting the center point of the arch shape to the center point of the layout area.

When the item is set by the layout area center setting unit so that the center point of the arch shape is the center point of the layout area based on the attribute information of the arch-shaped item, an item width changing unit generates attribute information for an arch-shaped item that has a different width after editing than before editing by moving only a first movement point, which is one point inside either one of the two width definition areas of the item, to a point at a different position while holding the center point of the arch shape to the center point of the layout area.

When the item is set by the layout area center setting unit so that the center point of the arch shape is the center point of the layout area based on the attribute information of the arch-shaped item, an item height changing unit generates attribute information for an arch-shaped item that has a different height after editing than before editing by moving only a second movement point, which is one point inside either one of the two height definition areas of the item, to a point at a different position while holding the center point of the arch shape to the center point of the layout area.

When the item is set by the layout area center setting unit so that the center point of the arch shape is the center point of the layout area based on the attribute information of the arch-shaped item, an item position changing unit generates attribute information for an arch-shaped item at a different position after editing than before editing by moving only a third movement point, which is one point inside the area of the item other than the two width definition areas and the two height definition areas of the item, to a point at a different position while holding the center point of the arch shape to the center point of the layout area.

The arch-shape generating unit generates the attribute information of the arch-shaped item having vertical and horizontal dimensions so that the top side and the bottom side of the rectangle become the two arcs of the arch shape, and the left side and the right side of the rectangle become the two line segments of the arch shape if the item after editing is an arch shape having the shape of the above-described closed area.

Furthermore, if the item after editing is the above-described fan shape, the top side or the bottom side of the rectangle becomes the single arc of the arch shape, and the left side and the right side of the rectangle become the two line segments of the arch shape.

An arch shape (A) a closed area formed by two line segments and two arcs that are sections of two concentric circles that have different radii and are segmented by two straight radial lines, or (B) a fan shape formed by two line segments and one arc that is a section of one circle segmented by two straight radial lines.

The center point of the circle forming the layout area, or the center point of the concentric circles of the donut shape, is the center point of the layout area.

The center point of the arcs forming the arch shape is the center point of the arch shape, the length of the two line segments forming the arch shape is the height of the arch shape, and the midpoints of the line segments forming the arch shape are the width definition points of the arch shape.

When the arch shape is a closed area as described above, the midpoints of the two arcs forming the shape of the closed area are the height definition points of the arch shape.

When the arch shape is a fan shape, the midpoint of the arc and the point of contact of the two line segments forming the fan shape are the height definition points of the arch shape.

The arc of which the end points are the two width definition points of the arch shape and the center point is the center point of the arch shape is the height center arc of the arch shape.

The length of the height center arc of the arch shape is the width of the arch shape, and the midpoint of the height center arc of the arch shape is the midpoint of the arch shape.

The straight line passing through the midpoint and the center point of the arch shape is the width center line of the arch shape, and the distance from the line segment joining the two width definition points of the arch shape to the midpoint of the arch shape is the curvature.

The intersection of the diagonals of the rectangle is the center point of the rectangle, the length of the left side and the right side of the rectangle is the height of the rectangle, and the length of the top side and the bottom side of the rectangle is the width of the rectangle.

Prescribed areas containing the width definition points are the width definition areas, and prescribed areas containing the height definition points are the height definition areas.

This enables editing arch-shaped items conforming to the shape of the label surface of DVDs, CDs, and other optical recording media.

More specifically, an arch shape can be rendered and edited so that the center point of the arcs forming the arch shape matches the center of the label surface of the DVD, CD, or other optical recording medium.

The shape, rotation angle, and position of an item can therefore be changed when the item is an arch shape using the same editing operation as when the item is a rectangle. More specifically, the same operation can be used to edit a rectangular item and to edit an arch-shaped item.

A single operating procedure can also change at least any one of the shape, position, or angle of rotation in one direction of the item, or the shape of the item (rectangular or arch-shaped). The operator can therefore easily edit an item.

For example, when the operator uses a mouse to change the layout position of an arch-shaped item, the operator can change the layout position of the item in the same way as when the item is a rectangle by simply moving a point in the area of the item before the item is edited to the position desired after the item is changed.

(18) The arch-shape generating unit of the item editing device according to this aspect of the invention generates attribute information for the arch-shaped item so that the position of the center point of the rectangular item before editing is the position of the midpoint of the arch-shaped item after editing, the width of the rectangular item before editing and the width of the arch-shaped item after editing are the same, the height of the rectangular item before editing and the height of the arch-shaped item after editing are the same, and the center point of the arch-shaped item after editing is the center point of the layout area.

A rectangular item can therefore be changed to an item with an arch shape matching the shape of the label surface of the DVD, CD, or other optical recording medium.

(19) The arch shape curvature changing unit generates attribute information for an arch-shaped item that has a different curvature after editing than before editing by generating the attribute information of the arch-shaped item so that the position of the midpoint of the arch-shaped item before editing is the position of the midpoint of the arch-shaped item after editing, the width of the arch-shaped item before editing and the width of the arch-shaped item after editing are the same, the height of the arch-shaped item before editing and the height of the arch-shaped item after editing are the same, and the center point of the arch-shaped item after editing is the layout area center point.

A rectangular item can therefore be changed to an item with an arch shape matching the shape of the label surface of the DVD, CD, or other optical recording medium.

(20) The arch shape width changing unit generates attribute information for an arch-shaped item that has a different width after editing than before editing by generating the attribute information of the arch-shaped item so that when the closer of the two width definition points of the arch-shaped item before editing to the first movement point is a first width definition point and the farther point is a second width definition point, and the angle formed by a line segment connecting the layout area center point and the first width definition point and a line segment connecting the layout area center point and the first movement point after the shape is changed is a width-change angle: the position of the center point of the arch-shaped item before and after editing is the position of the layout area center point; the position of the midpoint of the arch-shaped item before editing is the position of the midpoint of the arch-shaped item after editing; the height of the arch-shaped item before editing and the height of the arch-shaped item after editing are the same; and the positions of the two width definition points of the arch-shaped item after editing are the position of the first width definition point of the arch-shaped item before editing rotated the width-change angle clockwise around the layout area center point, and the position of the second width definition point of the arch-shaped item before editing rotated the width-change angle counterclockwise around the layout area center point.

An item that is an arch shape before editing can thus be changed to an arch-shaped item of a different width after editing while retaining the shape of an arch matching the shape of the label surface of the DVD, CD, or other optical recording medium.

(21) The arch shape width changing unit generates attribute information for an arch-shaped item that has a different width after editing than before editing by generating the attribute information of the arch-shaped item so that when the closer of the two width definition points of the arch-shaped item before editing to the first movement point is a first width definition point and the farther point is a second width definition point, and the angle formed by a line segment connecting the layout area center point and the first width definition point and a line segment connecting the layout area center point and the first movement point after the shape is changed is a width-change angle: the position of the center point of the arch-shaped item before and after editing is the position of the layout area center point; the height of the arch-shaped item before editing and the height of the arch-shaped item after editing are the same; and the positions of the two width definition points of the arch-shaped item after editing are the position of the first width definition point of the arch-shaped item before editing rotated the width-change angle clockwise around the layout area center point, and the position of the second width definition point of the arch-shaped item before editing.

An item that is an arch shape before editing can thus be changed to an arch-shaped item of a different width after editing while retaining the shape of an arch matching the shape of the label surface of the DVD, CD, or other optical recording medium.

(22) The arch shape height changing unit generates attribute information for an arch-shaped item that has a different height after editing than before editing by generating the attribute information of the arch-shaped item so that when the closer of the two height definition points of the arch-shaped item before editing to the second movement point is a first height definition point and the farther point is a second height definition point: the position of the center point of the arch-shaped item before and after editing is the position of the layout area center point; the height of the arch-shaped item after editing is the height of the arch-shaped item before editing changed by the difference between the distance between the second movement point before moving and the center point of the arch shape and the distance between the second movement point after moving and the center point of the arch shape; the two line segments of the arch-shaped item after editing are extensions of the two line segments of the arch-shaped item before editing; and the second height definition point or the arc on which the second height definition point is located in the arch-shaped item before editing is the second height definition point or one arc of the arch-shaped item after editing.

An item that is an arch shape before editing can thus be changed to an arch-shaped item of a different height after editing while retaining the shape of an arch matching the shape of the label surface of the DVD, CD, or other optical recording medium.

(23) The arch shape height changing unit generates attribute information for an arch-shaped item that has a different height after editing than before editing by generating the attribute information of the arch-shaped item so that when the closer of the two height definition points of the arch-shaped item before editing to the second movement point is a first height definition point and the farther point is a second height definition point: the position of the center point of the arch-shaped item before and after editing is the position of the layout area center point; the height of the arch-shaped item after editing is the height of the arch-shaped item before editing changed by the distance from a straight line that is parallel to a line segment connecting the two width definition points of the item before editing and passes through the second movement point before moving to the second movement point after moving; the two line segments of the arch-shaped item after editing are extensions of the two line segments of the arch-shaped item before editing; and the second height definition point or the arc on which the second height definition point is located in the arch-shaped item before editing is the second height definition point or one arc of the arch-shaped item after editing.

An item that is an arch shape before editing can thus be changed to an arch-shaped item of a different height after editing while retaining the shape of an arch matching the shape of the label surface of the DVD, CD, or other optical recording medium.

(24) The item position changing unit generates attribute information for an arch-shaped item at a different position after editing than before editing by generating the attribute information of the arch-shaped item so that when the intersection between a line segment connecting the third movement point before moving and the layout area center point and the height center arc of the arch-shaped item before editing is a first intersection point, and the intersection between a line segment connecting the third movement point after moving and the layout area center point and the height center arc of the arch-shaped item after editing is a second intersection point: the position of the center point of the arch-shaped item before and after editing is the position of the layout area center point; the width of the arch-shaped item before editing and the width of the arch-shaped item after editing are the same, the height of the arch-shaped item before editing and the height of the arch-shaped item after editing are the same; the distance between the third movement point before movement and the first intersection point and the distance between the third movement point after movement and the second intersection point are the same; and the length between the midpoint of the arch-shaped item before editing and the first intersection point on the height center arc of the arch-shaped item before editing, and the length between the midpoint of the arch-shaped item after editing and the second intersection point on the height center arc of the arch-shaped item after editing are the same.

An item that is an arch shape before editing can thus be changed to an arch-shaped item of a different position after editing while retaining the shape of an arch matching the shape of the label surface of the DVD, CD, or other optical recording medium.

A second aspect of an item editing method according to the invention is described next.

(25) This second aspect of an item editing method according to the invention is an item editing method for editing items that are positioned on a circular or donut-shaped layout area formed by two concentric circles of different radii. The item editing device defines as an arch shape (A) a closed area formed by two line segments and two arcs that are sections of two concentric circles that have different radii and are segmented by two straight radial lines, or (B) a fan shape formed by two line segments and one arc that is a section of one circle segmented by two straight radial lines. In addition, a prescribed area containing a width definition point is a width definition area, and a prescribed area containing a height definition point is a height definition area.

(a) A layout area center setting step sets for each item as an attribute contained in the attribute information of the item whether to use the center point of the layout area as the center point of the arch shape.

(b) Based on attribute information for an item that is a rectangle having vertical and horizontal dimensions, an arch-shape generating step generates attribute information for an arch-shaped item so that the midpoint of the item remains stationary while the center point of the arch shape is set to the center point of the layout area when the (a) layout area center setting step sets the item so that the center point of the arch shape is the center point of the layout area.

(c) When the item is set by the (a) layout area center setting step so that the center point of the arch shape is the center point of the layout area based on the attribute information of the arch-shaped item, an item curvature changing step generates attribute information for an arch-shaped item that has different curvature after editing than before editing while holding the midpoint of the item stationary and setting the center point of the arch shape to the center point of the layout area.

(d) When the item is set by the (a) layout area center setting step so that the center point of the arch shape is the center point of the layout area based on the attribute information of the arch-shaped item, an item width changing step generates attribute information for an arch-shaped item that has a different width after editing than before editing by moving only a first movement point, which is one point inside either one of the two width definition areas of the item, to a point at a different position while holding the center point of the arch shape to the center point of the layout area.

(e) When the item is set by the (a) layout area center setting step so that the center point of the arch shape is the center point of the layout area based on the attribute information of the arch-shaped item, an item height changing step generates attribute information for an arch-shaped item that has a different height after editing than before editing by moving only a second movement point, which is one point inside either one of the two height definition areas of the item, to a point at a different position while holding the center point of the arch shape to the center point of the layout area.

(f) When the item is set by the (a) layout area center setting step so that the center point of the arch shape is the center point of the layout area based on the attribute information of the arch-shaped item, an item position changing step generates attribute information for an arch-shaped item at a different position after editing than before editing by moving only a third movement point, which is one point inside the area of the item other than the two width definition areas and the two height definition areas of the item, to a point at a different position while holding the center point of the arch shape to the center point of the layout area.

The (b) arch-shape generating step generates the attribute information of the arch-shaped item having vertical and horizontal dimensions so that the top side and the bottom side of the rectangle become the two arcs of the arch shape, and the left side and the right side of the rectangle become the two line segments of the arch shape if the item after editing is an arch shape having the shape of the above-described closed area.

Furthermore, if the item after editing is the above-described fan shape, the top side or the bottom side of the rectangle becomes the single arc of the arch shape, and the left side and the right side of the rectangle become the two line segments of the arch shape.

This aspect of the invention achieves the same effect as the item editing device described above.

(26) The (b) arch-shape generating step generates attribute information for the arch-shaped item so that the position of the center point of the rectangular item before editing is the position of the midpoint of the arch-shaped item after editing, the width of the rectangular item before editing and the width of the arch-shaped item after editing are the same, the height of the rectangular item before editing and the height of the arch-shaped item after editing are the same, and the center point of the arch-shaped item after editing is the center point of the layout area.

This aspect of the invention achieves the same effect as the item editing device described above.

(27) The (c) arch shape curvature changing step generates attribute information for an arch-shaped item that has a different curvature after editing than before editing by generating the attribute information of the arch-shaped item so that the position of the midpoint of the arch-shaped item before editing is the position of the midpoint of the arch-shaped item after editing, the width of the arch-shaped item before editing and the width of the arch-shaped item after editing are the same, the height of the arch-shaped item before editing and the height of the arch-shaped item after editing are the same, and the center point of the arch-shaped item after editing is the layout area center point.

This aspect of the invention achieves the same effect as the item editing device described above.

(28) The (d) arch shape width changing step generates attribute information for an arch-shaped item that has a different width after editing than before editing by generating the attribute information of the arch-shaped item so that when the closer of the two width definition points of the arch-shaped item before editing to the first movement point is a first width definition point and the farther point is a second width definition point, and the angle formed by a line segment connecting the layout area center point and the first width definition point and a line segment connecting the layout area center point and the first movement point after the shape is changed is a width-change angle: the position of the center point of the arch-shaped item before and after editing is the position of the layout area center point; the position of the midpoint of the arch-shaped item before editing is the position of the midpoint of the arch-shaped item after editing; the height of the arch-shaped item before editing and the height of the arch-shaped item after editing are the same; and the positions of the two width definition points of the arch-shaped item after editing are the position of the first width definition point of the arch-shaped item before editing rotated the width-change angle clockwise around the layout area center point, and the position of the second width definition point of the arch-shaped item before editing rotated the width-change angle counterclockwise around the layout area center point.

This aspect of the invention achieves the same effect as the item editing device described above.

(29) The (d) arch shape width changing step generates attribute information for an arch-shaped item that has a different width after editing than before editing by generating the attribute information of the arch-shaped item so that when the closer of the two width definition points of the arch-shaped item before editing to the first movement point is a first width definition point and the farther point is a second width definition point, and the angle formed by a line segment connecting the layout area center point and the first width definition point and a line segment connecting the layout area center point and the first movement point after the shape is changed is a width-change angle: the position of the center point of the arch-shaped item before and after editing is the position of the layout area center point; the height of the arch-shaped item before editing and the height of the arch-shaped item after editing are the same; and the positions of the two width definition points of the arch-shaped item after editing are the position of the first width definition point of the arch-shaped item before editing rotated the width-change angle clockwise around the layout area center point, and the position of the second width definition point of the arch-shaped item before editing.

This aspect of the invention achieves the same effect as the item editing device described above.

(30) The (e) arch shape height changing step generates attribute information for an arch-shaped item that has a different height after editing than before editing by generating the attribute information of the arch-shaped item so that when the closer of the two height definition points of the arch-shaped item before editing to the second movement point is a first height definition point and the farther point is a second height definition point: the position of the center point of the arch-shaped item before and after editing is the position of the layout area center point; the height of the arch-shaped item after editing is the height of the arch-shaped item before editing changed by the difference between the distance between the second movement point before moving and the center point of the arch shape and the distance between the second movement point after moving and the center point of the arch shape; the two line segments of the arch-shaped item after editing are extensions of the two line segments of the arch-shaped item before editing; and the second height definition point or the arc on which the second height definition point is located in the arch-shaped item before editing is the second height definition point or one arc of the arch-shaped item after editing.

This aspect of the invention achieves the same effect as the item editing device described above.

(31) The (e) arch shape height changing step generates attribute information for an arch-shaped item that has a different height after editing than before editing by generating the attribute information of the arch-shaped item so that when the closer of the two height definition points of the arch-shaped item before editing to the second movement point is a first height definition point and the farther point is a second height definition point: the position of the center point of the arch-shaped item before and after editing is the position of the layout area center point; the height of the arch-shaped item after editing is the height of the arch-shaped item before editing changed by the distance from a straight line that is parallel to a line segment connecting the two width definition points of the item before editing and passes through the second movement point before moving to the second movement point after moving; the two line segments of the arch-shaped item after editing are extensions of the two line segments of the arch-shaped item before editing; and the second height definition point or the arc on which the second height definition point is located in the arch-shaped item before editing is the second height definition point or one arc of the arch-shaped item after editing.

This aspect of the invention achieves the same effect as the item editing device described above.

(32) The (f) item position changing step generates attribute information for an arch-shaped item at a different position after editing than before editing by generating the attribute information of the arch-shaped item so that when the intersection between a line segment connecting the third movement point before moving and the layout area center point and the height center arc of the arch-shaped item before editing is a first intersection point, and the intersection between a line segment connecting the third movement point after moving and the layout area center point and the height center arc of the arch-shaped item after editing is a second intersection point: the position of the center point of the arch-shaped item before and after editing is the position of the layout area center point; the width of the arch-shaped item before editing and the width of the arch-shaped item after editing are the same, the height of the arch-shaped item before editing and the height of the arch-shaped item after editing are the same; the distance between the third movement point before movement and the first intersection point and the distance between the third movement point after movement and the second intersection point are the same; and the length between the midpoint of the arch-shaped item before editing and the first intersection point on the height center arc of the arch-shaped item before editing, and the length between the midpoint of the arch-shaped item after editing and the second intersection point on the height center arc of the arch-shaped item after editing are the same.

This aspect of the invention achieves the same effect as the item editing device described above.

The shape, rotation angle, and position of an item can therefore be changed when the item is an arch shape using the same editing operation as when the item is a rectangle. More specifically, the same operation can be used to edit a rectangular item and to edit an arch-shaped item.

A single operating procedure can also change at least any one of the shape, position, or angle of rotation in one direction of the item, or the shape of the item (rectangular or arch-shaped). The operator can therefore easily edit an item. The shape, angle of rotation, position, and other aspects of the item can also be changed closely to the shape intended by the operator after the item is changed.

Items can therefore be edited to an arch shape conforming to the shape of the label surface of DVDs, CDs, and other optical recording media.

More specifically, an arch shape can be rendered and edited so that the center point of the arcs forming the arch shape matches the center of the label surface of the DVD, CD, or other optical recording medium.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 10 shows an arch-shaped item generated by the arch-shape generating unit 41 when the disc center setting unit is ON.

FIG. 11 shows an arch-shaped item generated by the item curvature changing unit 42 when the disc center setting unit is ON.

FIG. 12 shows an arch-shaped item generated by the item width changing unit 43 when the disc center setting unit is ON.

FIG. 13 shows an arch-shaped item generated by the item height changing unit 44 when the disc center setting unit is ON.

FIG. 14 shows an arch-shaped item generated by the item position changing unit 45 when the disc center setting unit is ON.

DESCRIPTION OF THE PREFERRED EMBODIMENTS

First and second preferred embodiments of the present invention are described below with reference to the accompanying figures. These embodiments are described by way of example only and do not limit the scope of the invention. It will be obvious to one with ordinary skill in the related art that some or all of the elements described below can be replaced with similar or equivalent elements, and all such variations are also included in the scope of the invention.

Figure 1:
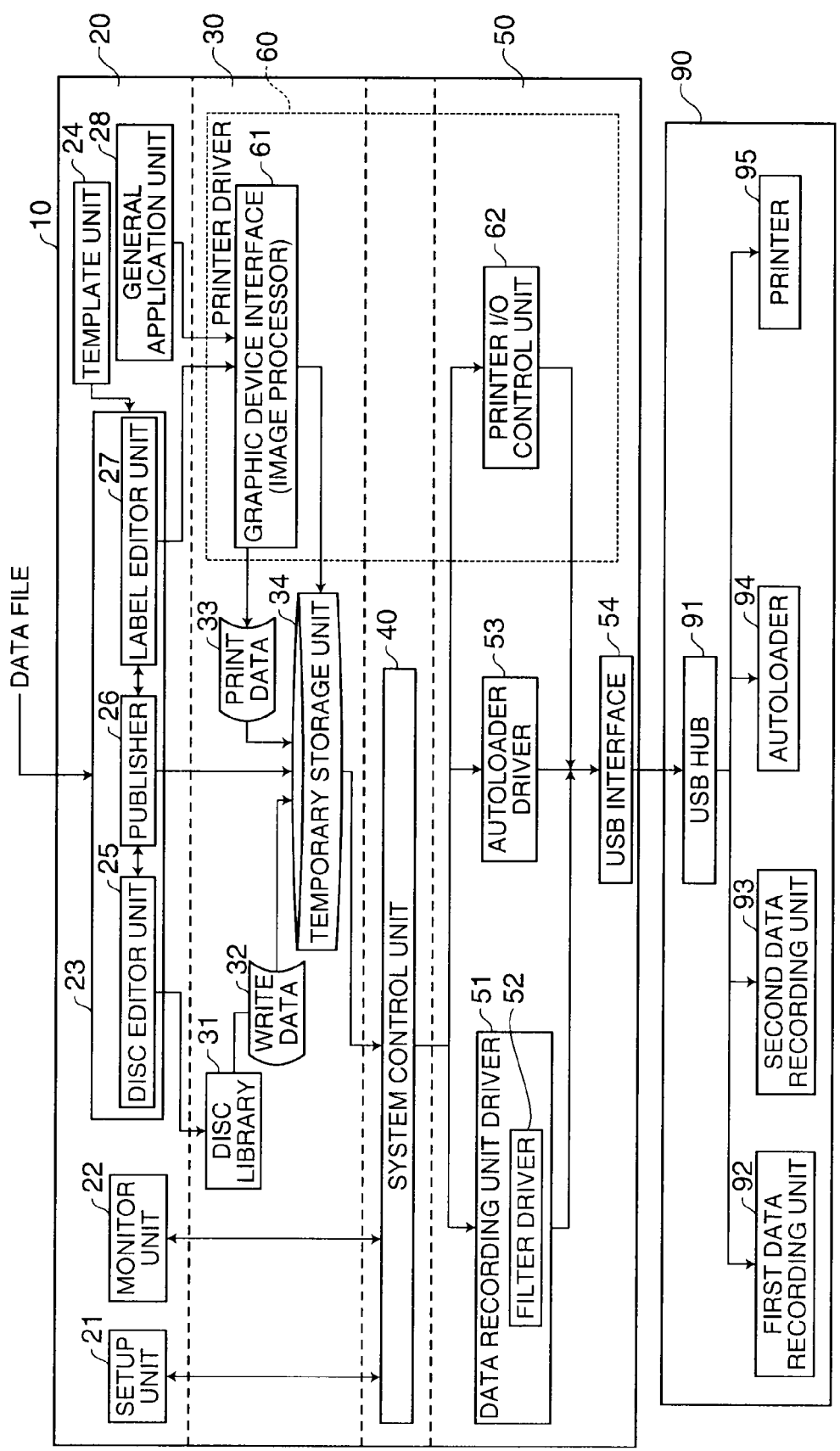
FIG. 1 shows a recording medium production control device 10 having a label editor unit 27 according to the present invention and a recording medium production device 90 that is controlled by the recording medium production control device 10.

FIG. 1 shows a recording medium production control device 10 having a label editing unit 27 according to the present invention and a recording medium production device 90 that is controlled by the recording medium production control device 10.

In FIG. 1 the recording medium production control device 10 may be embodied in a personal computer (PC), server, or other host device and installed software.

The PC or other host device typically includes hardware such as a CPU, memory such as RAM or ROM, and logic circuits, and software, and can run a general purpose operating system such as Windows (R).

The recording medium production control device 10 is described in terms of functional blocks. The recording medium production control device 10 includes an application unit 20, a data conversion unit 30, a system control unit 40, and a device control unit 50.

The application unit 20 provides the basic functions for producing optical recording media, and the data conversion unit 30 generates and temporarily stores the write data, print data, and production settings according to data received from the application unit 20. The system control unit 40 schedules the sequence of operating processes for producing optical recording media based on control signals from the data conversion unit 30, and controls the operating sequence of the drivers in the device control unit 50. The device control unit 50 includes a USB interface 54 and various drivers for controlling the operation of the recording medium production device 90.

The write data is the information that is written to the optical recording medium. The print data is the information that is printed on the label surface of the optical recording medium. The production settings are information defining the type of command request (any one of a write and print request, a write request, and a print request), the number of optical recording media to produce, and the type, for example.

The recording medium production device 90 includes a USB hub 91 and connected devices such as a first data recording unit 92, a second data recording unit 93, an autoloader 94 for carrying the optical recording media to different parts inside the recording medium production device 90, and a printer 95. The recording medium production device can write to two optical recording media simultaneously.

While two data recording units and one printer are shown in FIG. 1, more data recording units and printers can be provided to enable parallel processing of more media.

When a write and print request is executed the printer 95 prints after writing data to the first data recording unit 92 or second data recording unit 93. The first data recording unit 92 or the second data recording unit 93 could have data written to it after the printer 95 finishes printing, but errors in the data writing process are more important and occur more frequently than errors in the printing process, and executing the data writing process first is therefore preferable.

The optical recording media production procedure will be described after briefly describing the functions of the recording medium production control device 10.

The application unit 20 provides a user interface for specifying the data file storing the desired write data and for configuring the print content and format.

In the embodiment shown in FIG. 1 the setup unit 21 provides a function for setting the initial configuration of the recording medium production device 90 (information directed to specific parts of the recording medium production device 90), and the monitor unit 22 provides a function for displaying and confirming the device status information describing the operating status of the various parts of the recording medium production device 90.

The disc production unit 23 has a disc editor unit 25, a publisher 26, and a label editor unit 27, and is used for editing the recording content, editing the production settings, and editing the label. The label can be edited using templates stored in a template unit 24.

The general application unit 28 provides functions different from the disc production unit 23, which handles print requests for the label surface.

The content edited by the application unit 20 is output to the data conversion unit 30, and the write data 32 generated by the disc library 31 and the print data 33 generated by the graphic device interface 61 (GDI) of the printer driver 60 (printing control unit) is temporarily stored in the temporary storage unit 34 until the requested job is completed based on the type of the command request.

The system control unit 40 controls the operating procedure of the different devices in order to execute the job request stored in the temporary storage unit 34.

The system control unit 40 plans the operating procedure of the devices 92 to 95 that execute the job requests stored in the temporary storage unit 34, and generates an operating schedule describing the operating procedure.

The system control unit 40 also controls the operation of the devices 92 to 95 via the device control unit 50 based on the device status information describing the operating status acquired from the devices 92 to 95 through the device control unit 50, and the operating schedule.

More specifically, the system control unit 40 outputs the operating commands for the devices 92 to 95 to the data recording unit driver 51, the auto loader driver 53, and the print I/O control unit 62 based on the device status information and the operating schedule. The data recording unit driver 51, the auto loader driver 53, and the print I/O control unit 62 of the printer driver 60 then control the operation of the devices 92 to 95.

This enables controlling the devices 92 to 95 to pick up a blank optical recording medium for each job request, convey, write on, and print on the optical recording medium, and transport the recorded optical recording medium without the devices 92 to 95 interfering with each other. When producing multiple optical recording media, this arrangement also enables efficiently processing the media without the different devices interfering with each other.

The data recording unit driver 51 includes a filter driver 52 that selects only operating commands from the system control unit 40 as valid commands, and suppresses accepting operating commands for the first data recording unit 92 and the second data recording unit 93 from any source other than the system control unit 40. More specifically, the filter driver 52 allows control of the first data recording unit 92 or the second data recording unit 93 based on requests from a specific application, and suppresses requests from other applications so that those other applications cannot control the first data recording unit 92 or second data recording unit 93.

Figure 2C:
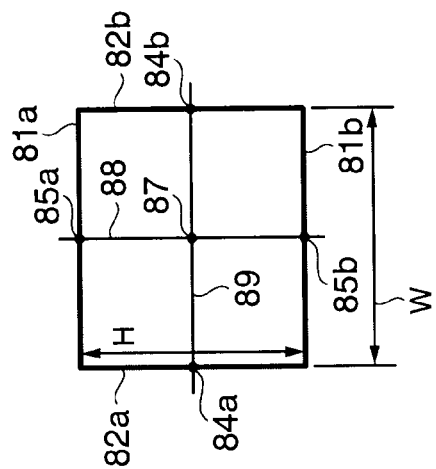
FIGS. 2A, 2B, and 2C show the various parts of an item.
Figure 2B:
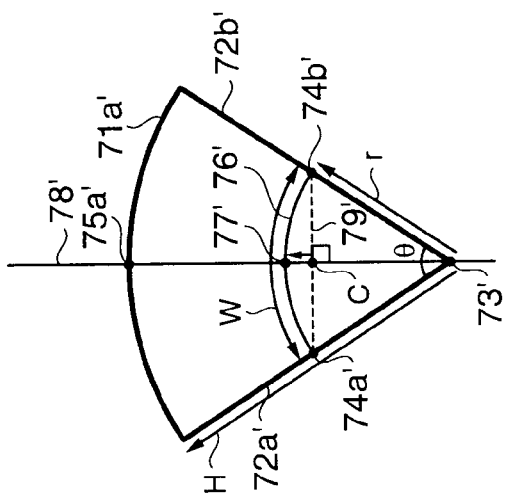
Figure 2A:
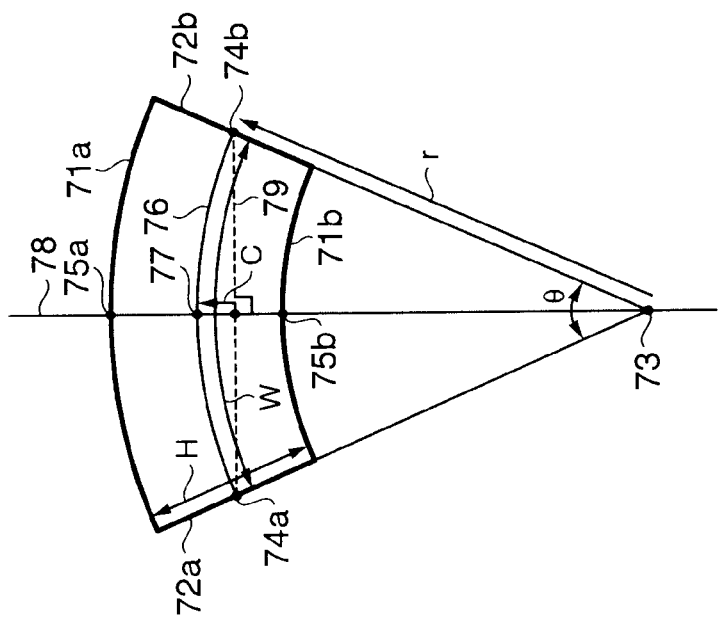

The names of different parts of an item are described next with reference to FIGS. 2A and 2B. FIG. 2A shows the parts in an item that is in the shape of a closed area defined by two arcs and two line segments (called a "first arch shape" below), FIG. 2B shows a fan-shaped item, and FIG. 2C shows a rectangular item.

The names of the parts of a first arch shape as shown in FIG. 2A are defined as follows.

The center point of the two arcs 71*a* and 71*b* forming the first arch shape is first arch center point 73.

The length of either of the two line segments 72*a* and 72*b* forming the first arch shape is the height H of the first arch shape.

The midpoints of the two line segments 72*a* and 72*b* forming the first arch shape are the width definition points 74*a* and 74*b*, respectively, of the first arch shape, and the midpoints of the arcs 71*a* and 71*b* forming the first arch shape are the height definition points 75*a* and 75*b*, respectively, of the first arch shape.

The arc of which the end points are the two width definition points 74*a* and 74*b* of the first arch shape, and the center point of which is the first arch center point 73, is the height center arc 76 of the first arch shape.

The length of the height center arc 76 of the first arch shape is the width W of the first arch shape, and the midpoint of the height center arc 76 of the first arch shape is the midpoint 77 of the first arch shape.

The straight line passing through the midpoint 77 and the center point 73 of the first arch shape is the width center line 78 of the first arch shape, and the distance from the line segment 79 joining the two width definition points 74*a* and 74*b* of the first arch shape to the midpoint 77 of the first arch shape is curvature C.

The angle formed by the width definition points 74*a* and 74*b* and the center point 73 is the open angle θ of the first arch shape, and the distance from the center point 73 to the width definition points 74*a* and 74*b* is the radius r of the first arch shape.

The names of the parts of a fan-shaped item as shown in FIG. 2B are defined as follow.

The center point of the arc 71' forming a fan shape is the center point 73' of the fan shape.

The length of either of the two line segments 72'*a* and 72'*b* forming the fan shape is the height H of the fan shape.

The midpoints of the line segments 72'*a* and 72'*b* forming the fan shape are the width definition points 74'*a* and 74'*b* of the fan shape, and the midpoint of the arc 71'*a* forming the fan shape is the height definition point 75'*a* of the arc 71'*a*.

The arc of which the end points are the two width definition points 74'*a* and 74'*b* of the fan shape, and the center point of which is the center point 73' of the fan shape, is the height center arc 76' of the fan shape.

The length of the height center arc 76' of the fan shape is the width W of the fan shape, and the midpoint of the height center arc 76' of the fan shape is the midpoint 77' of the fan shape.

The straight line passing through the midpoint 77' and the center point 73' of the fan shape is the width center line 78' of the fan shape, and the distance from the line segment 79' joining the two width definition points 74'a and 74'b of the fan shape to the midpoint 77' of the fan shape is curvature C.

The angle formed by the width definition points 74'a and 74'b and the center point 73' is the open angle θ of the fan shape, and the distance from the center point 73' to the width definition points 74'a and 74'b is the radius r of the fan shape.

The names of the parts of a rectangular item as shown in FIG. 2C are defined as follow.

The intersection of the diagonals of the rectangle is the center point 87 of the rectangle, the length of either of the left side 82a and the right side 82b of the rectangle is the height H of the rectangle, and the length of either of the top side 81a and the bottom side 81b of the rectangle is the width W of the rectangle.

The midpoints of the left side 82a and right side 82b of the rectangle are the width definition points 84a and 84b of the rectangle, and the midpoints of the top side 81a and bottom side 81b of the rectangle are the height definition points 85a and 85b of the rectangle. The straight line through the height definition points 85a and 85b and the center point 87 of the rectangle is the width center line 88 of the rectangle, and the straight line through the width definition points 84a and 84b and the center point 87 is the height center line 89 of the rectangle.

A first embodiment of an item editing device according to the present invention is described next with reference to FIG. 3 to FIG. 8.

Figure 3:
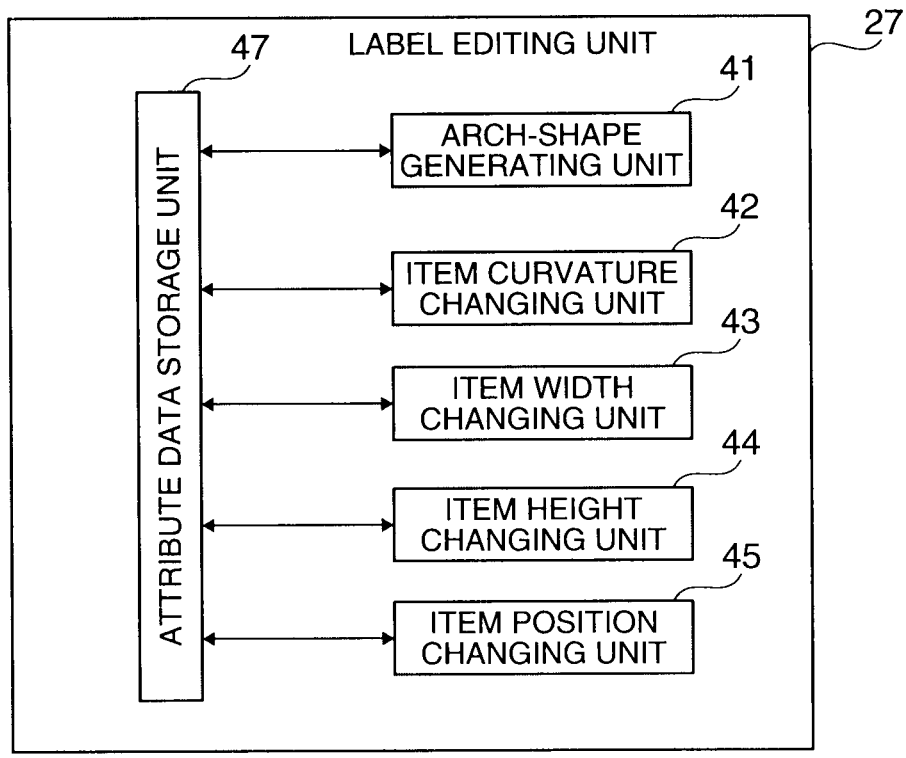
FIG. 3 is a function block diagram of a first preferred embodiment of the label editing unit 27.

FIG. 3 is a function block diagram of the label editing unit 27 in a first embodiment of the invention.

FIG. 3 shows only the functions of the parts related to the invention.

The label editing unit 27 has an arch-shape generating unit 41, an item curvature changing unit 42, an item width changing unit 43, an item height changing unit 44, an item position changing unit 45, and a attribute data storage unit 47.

The first arch shape described above is used by way of example as the arch shape below.

The arch-shape generating unit 41 gets the attributes of a selected item that is a rectangle having vertical and horizontal dimensions from among a group of items stored in the attribute data storage unit 47.

By moving a point Q (designated center point) near the center point 87 of the rectangular item having vertical and horizontal dimensions to another point P based on the retrieved attributes of the item before the item is changed, the arch-shape generating unit 41 generates attribute information for an arch-shaped item where the midpoint 77 of the arch-shaped item after the shape is changed is the point shifted the distance from point Q to point P in the direction of the width center line, and stores the attribute information in the attribute data storage unit 47.

Figure 4:
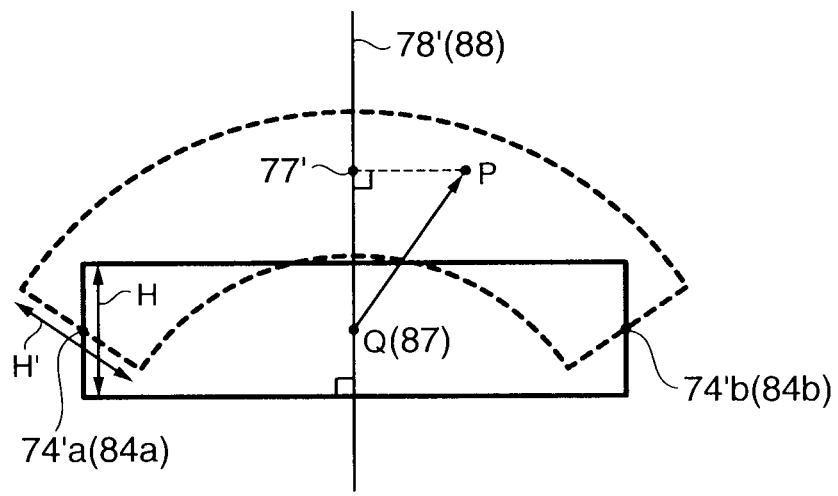
FIG. 4 shows an arch-shaped item generated by an arch-shape generating unit 41.

FIG. 4 shows an arch-shaped item generated by the arch-shape generating unit 41.

As shown in FIG. 4 the positions of the width definition points 84a and 84b of the rectangular item before the shape is changed ("before editing") are the positions of the width definition points 74'a and 74'b of the arch-shaped item after the shape is changed ("after editing"), and the height H of the rectangular item before editing is the height H' of the arch-shaped item after editing.

More specifically, the attribute information for the arch-shaped item after editing is generated so that the width definition points and the height of the item are the same before and after editing.

The position of the midpoint 77' of the arch-shaped item after editing is the position on the width center line 88 of the rectangular item before editing that is offset from point Q by the distance between point Q and point P on a straight line that passes through point Q and is parallel to the height center line 89 through the width definition points 84a and 84b of the arch-shaped item before editing.

More specifically, the position of the midpoint 77' of the arch-shaped item after editing is the point at the intersection of a line that passes through point P and is perpendicular to the width center line 88 of the rectangular item before editing.

The item curvature changing unit 42 gets the attribute information for the selected item from the items stored in the attribute data storage unit 47.

By moving a point Q near the midpoint 77 of the arch-shaped item before editing to another point P based on the retrieved attribute information for the item before editing, the item curvature changing unit 42 generates attribute information for an arch-shaped item that has a different curvature after editing than before editing where the midpoint 77 of the arch-shaped item after the shape is changed is the point shifted the distance from point Q to point P in the direction of the width center line, and stores the attribute information in the attribute data storage unit 47.

Figure 5:
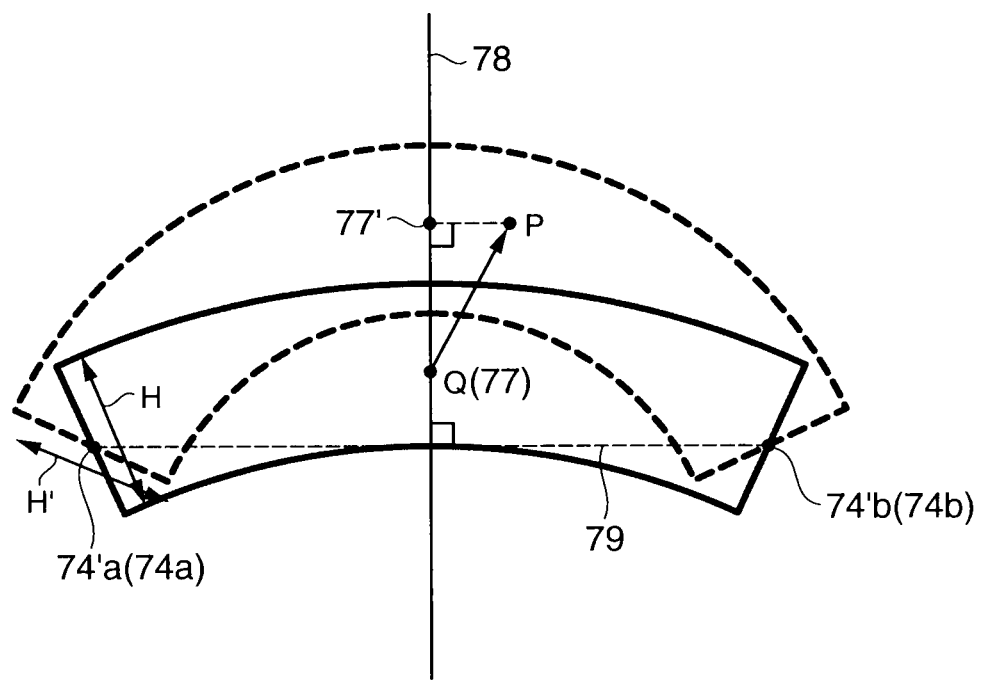
FIG. 5 shows an arch-shaped item generated by an item curvature changing unit 42.

FIG. 5 shows an arch-shaped item generated by the item curvature changing unit 42.

As shown in FIG. 5, the positions of the width definition points 74a and 74b of the arch-shaped item before editing are the positions of the width definition points 74'a and 74'b of the arch-shaped item after editing, and the height H of the rectangular item before editing is the height H' of the arch-shaped item after editing.

More specifically, the attribute information for the arch-shaped item after editing is generated so that the width definition points and the height of the item are the same before and after editing.

The position of the midpoint 77' of the arch-shaped item after editing is the position on the width center line 78 of the arch-shaped item before editing that is offset from point Q by the distance between point Q and point P on a straight line that passes through point Q and is parallel to the line segment 79 through the width definition points 74'a and 74'b of the arch-shaped item before editing.

More specifically, the position of the midpoint 77' of the arch-shaped item after editing is the point at the intersection of a line that passes through point P and is perpendicular to the width center line 78 of the arch-shaped item before editing.

Note that if point P is on an extension of the line segment 79 connecting the width definition points 74a and 74b of the arch-shaped item before editing, the item after editing is a rectangle.

More specifically, the curvature of the item after editing is 0.

The item width changing unit 43 gets the attribute information for the selected item from among the items stored in the attribute data storage unit 47.

By moving a point Q near either of the two width definition points 74a and 74b of the arch-shaped item before editing to another point P based on the retrieved attribute information for the item before editing, the item width changing unit 43 generates attribute information for an arch-shaped item that has a different width after editing than before editing where the width definition point 74a and 74b that was not moved and the point P are the width definition points 74'a and 74'b after editing, and stores the attribute information in the attribute data storage unit 47.

FIG. 6 shows an arch-shaped item generated by the item width changing unit 43.

Figure 6A:
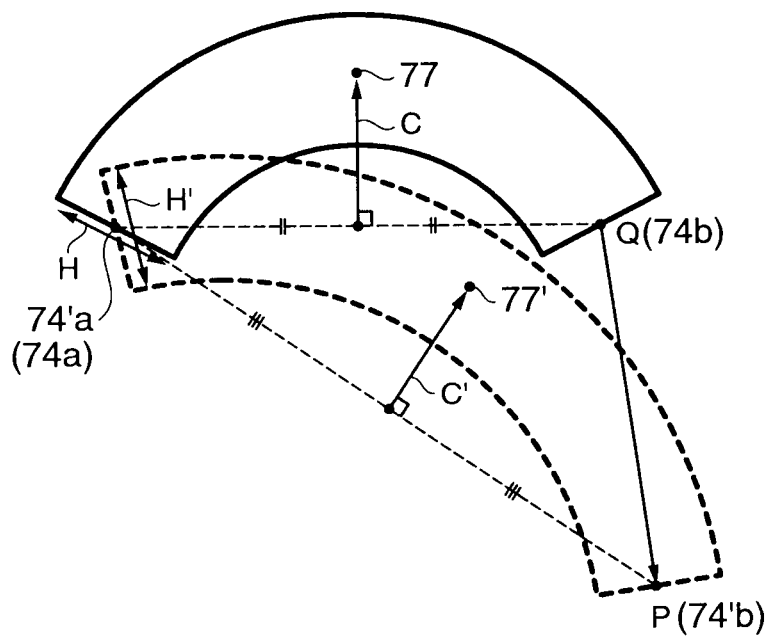
FIGS. 6A and 6B show an arch-shaped item generated by an item width changing unit 43.
Figure 6B:
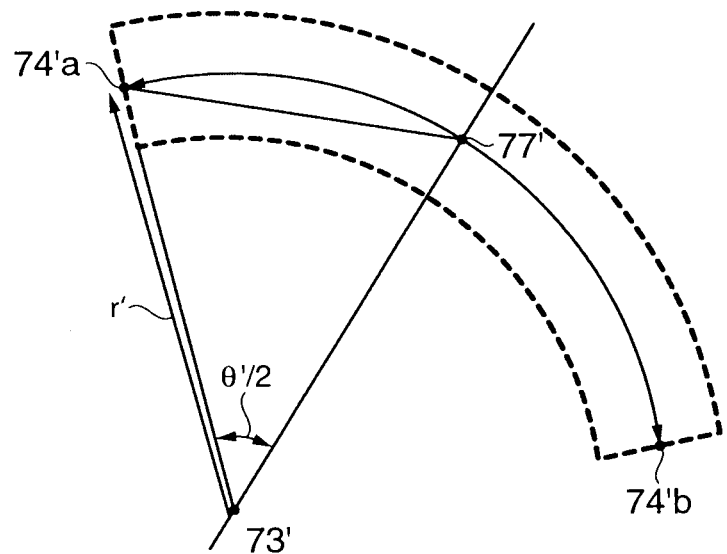

FIG. 6A shows the shapes of the item before and after editing, and FIG. 6B describes the width of the item after editing.

As shown in FIG. 6A, the height H of the arch-shaped item before editing is the height H' of the arch-shaped item after editing, the curvature C of the arch-shaped item before editing is the curvature C' of the arch-shaped item after editing, and the positions of the two width definition points 74'a and 74'b of the arch-shaped item after editing are the positions of the one width definition points 74'a and 74'b that was not moved and point P.

More specifically, the attribute information of the arch-shaped item after editing is generated so that the height and the curvature of the item and the one width definition points 74a and 74b that was not moved are the same before and after editing.

As shown in FIG. 6B, if the open angle θ' and the arch radius r' of the arch-shaped item after editing are used, the width W' of the arch-shaped item after editing is expressed by the following equation. Note that the unit of the open angle θ' is degrees (°).

$$W'=2\times\pi\times r'\times\theta'/360$$

The item height changing unit 44 gets the attribute information for the selected item from among the items stored in the attribute data storage unit 47.

By moving a point Q near either of the two height definition points 75a and 75b of the arch-shaped item before editing to another point P based on the retrieved attribute information for the item before editing, the item height changing unit 44 generates attribute information for an arch-shaped item that has a different height after editing than before editing where the height definition point 75a or 75b that was not moved and the point P are the height definition points 75'a and 75'b after editing, and stores the attribute information in the attribute data storage unit 47.

Figure 7:
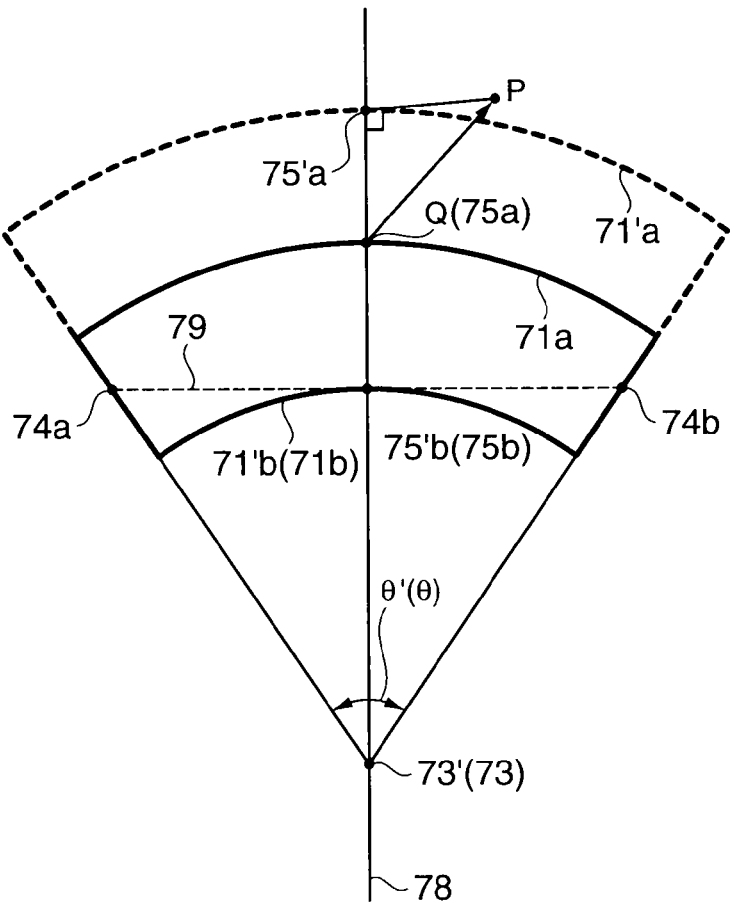
FIG. 7 shows an arch-shaped item generated by an item height changing unit 44.

FIG. 7 shows an arch-shaped item generated by the item height changing unit 44.

As shown in FIG. 7, the position of the center point 73 of the arch-shaped item before editing is the position of the center point 73' of the arch-shaped item after editing, and the open angle θ' of the arch-shaped item after editing is the open angle θ of the arch-shaped item before editing.

The height H' of the arch-shaped item after editing is the height H of the arch-shaped item before editing offset by the distance to the point P from a straight line that is parallel to the line segment 79 connecting the two width definition points 74a and 74b of the item before editing and passes through point Q.

The attribute information for the arch-shaped item after editing is generated so that the arc 71a or 71b of the item before editing on which the height definition point 75a or 75b that was not moved was present is an arc 71'a or 71'b of the item after editing.

The item position changing unit 45 gets the attribute information for the selected item from among the items stored in the attribute data storage unit 47.

Based on the retrieved attribute information of the item before editing, the item position changing unit 45 moves point Q in an item area not including the midpoint 77 of the arch-shaped item before editing, the two width definition points 74a and 74b and the two height definition points 75a and 75b to another point P.

As a result, the item position changing unit 45 generates attribute information for an item at a different position after editing than before editing so that the shape of the item is the same before and after editing, and the relative position of point Q to a prescribed point (such as the midpoint) in the area of the arch-shaped item before editing is the relative position of point P to a prescribed point (such as the midpoint) in the area of the arch-shaped item after editing, and stores the attribute information in the attribute data storage unit 47.

Figure 8:
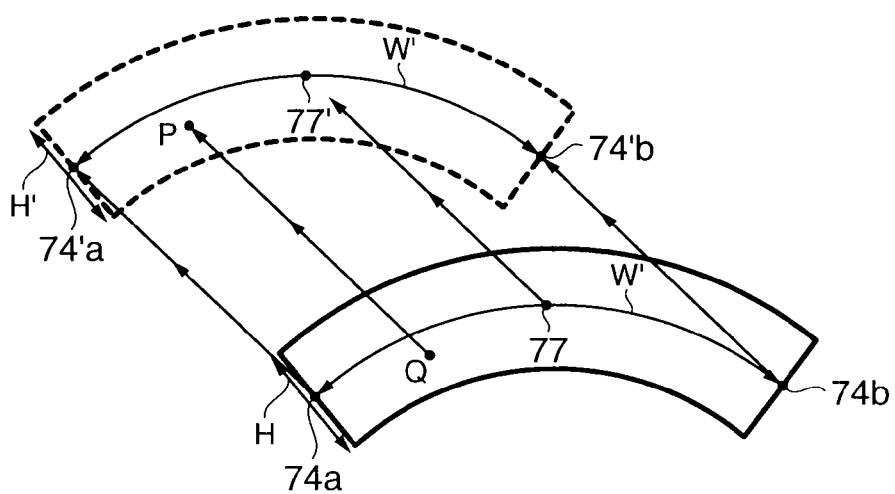
FIG. 8 shows an arch-shaped item generated by an item position changing unit 45.

FIG. 8 shows an arch-shaped item generated by the item position changing unit 45.

As shown in FIG. 8, the width W of the arch-shaped item before editing is the width W' of the arch-shaped item after editing, and the height H of the arch-shaped item before editing is the height H' of the arch-shaped item after editing.

The curvature C of the arch-shaped item before editing is also the curvature C' of the arch-shaped item after editing.

The attribute information for the arch-shaped item after editing is also generated so that the positions of the two width definition points 74'a and 74'b, the positions of the two height definition points 75'a and 75'b, and the midpoint 77 of the arch-shaped item after editing are offset by the distance from point Q to point P parallel to a line segment connecting point Q and point P from the positions of the two width definition points 74a and 74b, the positions of the two height definition points 75a and 75b, and the position of the midpoint 77 of the arch-shaped item before editing.

An arch-shaped item having the first arch shape is described above, but the same operation applies to a fan shape item.

A second embodiment of an item editing device according to the present invention is described next with reference to FIG. 9 to FIG. 14.

FIG. 1 and FIG. 2 used to describe the first embodiment above also apply to this second embodiment, and further description thereof is omitted below.

Figure 9:
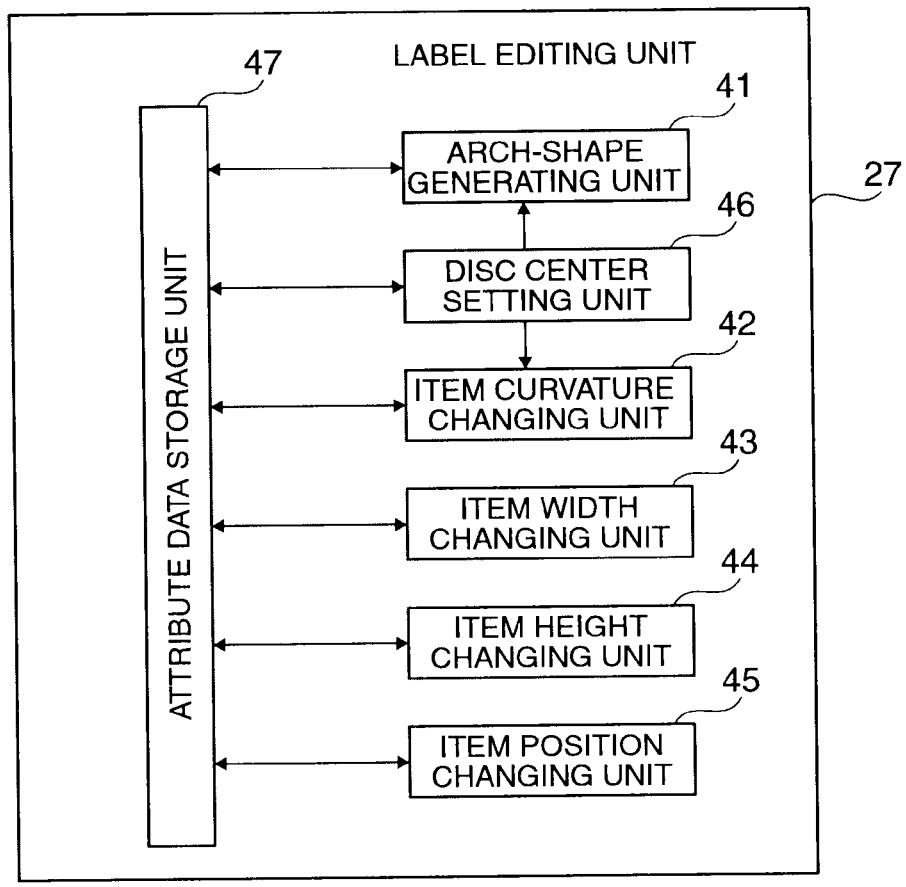
FIG. 9 is a function block diagram of a second preferred embodiment of the label editing unit 27.

FIG. 9 is a function block diagram of the label editing unit 27 in an item editing device according to this aspect of the invention.

FIG. 9 shows only the functions of the parts related to the invention.

The label editing unit 27 has an arch-shape generating unit 41, an item curvature changing unit 42, an item width changing unit 43, an item height changing unit 44, an item position changing unit 45, a disc center setting unit 46, and a attribute data storage unit 47.

The first arch shape described above is used by way of example as the arch shape below.

The disc center setting unit 46 sets as one of the attributes of the item a flag denoting whether to set the center point 73 of the arch shape as the layout area center point O.

More specifically, this setting by the disc center setting unit enables editing an item referenced to the center of the CD, DVD, or other disc in a layout area that is either the circle shape of the CD, DVD, or other disc to be printed or an arch-shaped area that is part of the disc circle.

When the shape of the selected item is a rectangle and the layout area center point O of the disc label surface is set to the center point 73 of the arch shape (referred to below as the "disc center setting ON"), the arch-shape generating unit 41 changes the shape of the item from a rectangle to an arch.

When the shape of the selected item is an arch and the disc center setting is ON, the item curvature changing unit 42 changes the curvature of the arch to the curvature of the disc label surface.

The arch-shape generating unit 41 gets the attribute information for the selected rectangular item having vertical and horizontal dimensions from among the items stored in the attribute data storage unit 47.

When the disc center setting is ON for the extracted item, the disc center setting unit 46 sets the center point 87 of the rectangular item having vertical and horizontal dimensions as the midpoint 77' of the arch-shaped item after editing based on the extracted attribute information for the item before editing.

The disc center setting unit 46 also generates attribute information for an arch-shaped item using the layout area center point O of the disc label surface as the center point 73' of the arch-shaped item after editing, and stores the attribute information in the attribute data storage unit 47.

Figure 10:
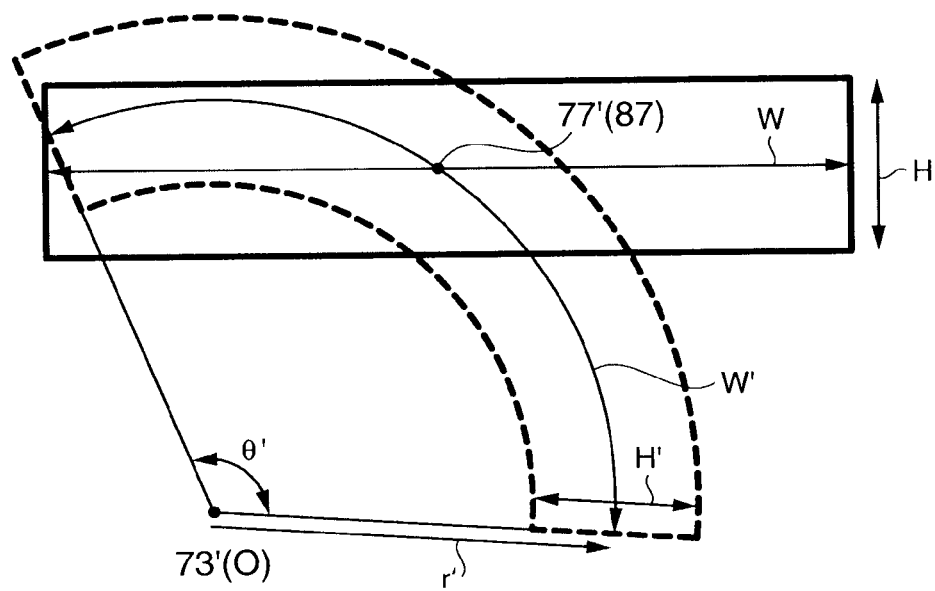

FIG. 10 shows an arch-shaped item generated by the arch-shape generating unit 41.

As shown in FIG. 10 the position of the center point 87 of the rectangular item before editing is the position of the midpoint 77' of the arch-shaped item after editing, the width W of the rectangular item before editing is the width W' of the arch-shaped item after editing, and the height H of the rectangular item before editing is the height H' of the arch-shaped item after editing.

The layout area center point O of the disc label surface is the center point 73' of the arch-shaped item after editing.

The attribute information for the arch-shaped item after editing is thus generated according to the shape of the disc label surface so that the center point, width, and height of the item are the same before and after editing.

The open angle θ' of the arch-shaped item after editing is expressed by the following equation using the arch radius r' of the arch-shaped item after editing and the width W of the rectangular item before editing.

Note that the unit of the open angle θ' is degrees (°).

$$\theta' = W \times 360 / (2 \times \pi \times r')$$

The item curvature changing unit 42 gets the attribute information for the selected arch-shaped item from among the items stored in the attribute data storage unit 47.

If the extracted item has the disc center setting ON, the disc center setting unit 46 sets the midpoint 77 of the arch-shaped item before editing as the midpoint 77' of the arch-shaped item after editing based on the extracted attribute information for the item before editing.

The disc center setting unit 46 then generates attribute information for the arch-shaped item using the layout area center point O of the disc label surface as the center point 73 of the arch-shaped item after editing, and stores the attribute information in the attribute data storage unit 47.

Figure 11:
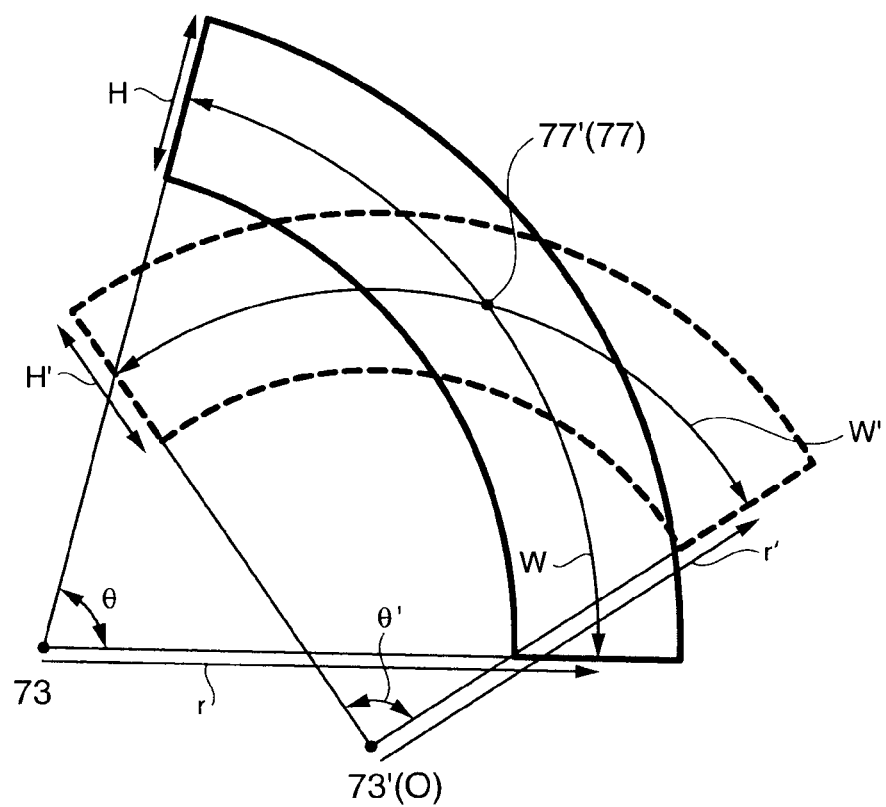

FIG. 11 shows an arch-shaped item generated by the item curvature changing unit 42.

As shown in FIG. 11, the position of the midpoint 77 of the arch-shaped item before editing is the position of the midpoint 77' of the arch-shaped item after editing, the width W of the arch-shaped item before editing is the width W' of the arch-shaped item after editing, and the height H of the arch-shaped item before editing is the height H' of the arch-shaped item after editing.

The layout area center point O of the disc label surface becomes the center point 73' of the arch-shaped item after editing. More specifically, the attribute information of the arch-shaped item after editing is generated according to the shape of the disc label surface so that the center point, the width, and the height of the item are retained before and after editing.

The open angle θ' of the arch-shaped item after editing is expressed by the following equation using the arch radius r' of the arch-shaped item after editing and the open angle θ and the arch radius r of the arch-shaped item before editing.

Note that the unit of the open angles θ' and θ is degrees (°).

$$\theta' = r \times \theta / r'$$

The item width changing unit 43 gets the attribute information for the selected item from among the items stored in the attribute data storage unit 47.

By moving a point Q near either of the two width definition points 74a and 74b of the arch-shaped item before editing to another point P based on the retrieved attribute information for the item before editing when the extracted item has the disc center setting ON, the item width changing unit 43 generates attribute information for an arch-shaped item having a different width after editing than before editing where the midpoint 77 of the arch-shaped item before editing is the midpoint 77' of the arch-shaped item after editing, and stores the attribute information in the attribute data storage unit 47.

Figure 12:
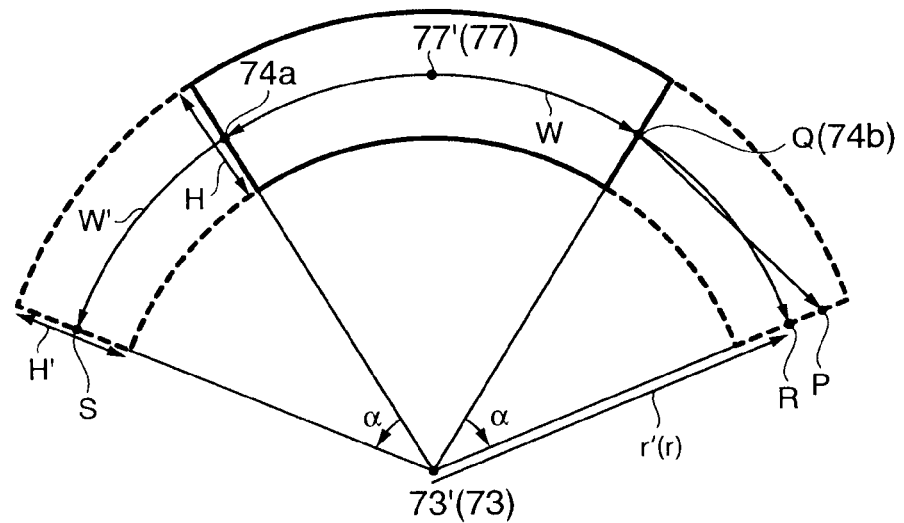

FIG. 12 describes the arch-shaped item generated by the item width changing unit 43.

As shown in FIG. 12 the position of the center point 73 of the arch-shaped item before editing is the center point 73' of the arch-shaped item after editing, the position of the midpoint 77 of the arch-shaped item before editing is the position of the midpoint 77' of the arch-shaped item after editing, and the height H of the arch-shaped item before editing is the height H' of the arch-shaped item after editing.

In addition, when the intersection between a circle that has the radius r of the arch-shaped item before editing and a straight line that passes through point P and the center point 73 of the arch-shaped item before editing is point R, point R is the position of one of the two width definition points 74'a and 74'b of the arch-shaped item after editing.

When α is the angle rotated (clockwise) from point Q to point R around the center point 73 of the arch-shaped item before editing, a point S is the point rotated −α (that is, α degrees counterclockwise) around the center point 73 of the arch-shaped item before editing from the one of the two width definition point 74a or 74b of the arch-shaped item before editing that is farthest from point Q, and this point S is the position of the other of the two width definition points 74'a and 74'b of the arch-shaped item after editing that is not point R.

The difference between the width W' of the arch-shaped item after editing and the width W of the arch-shaped item before editing is expressed by the following equation using the arch radius r of the arch-shaped item before editing. Note that the unit of α is degrees (°).

$$|W' - W| = 4 \times \pi \times r \times \alpha / 360$$

When the arch shape rotates from point Q to point R (clockwise), the width definition point 74a moves to point S above, but width definition point 74a can also not move.

In this case the position of the midpoint 77 of the arch-shaped item before editing differs from the position of the midpoint 77' of the arch-shaped item after editing, and the difference between the width W'' of the arch-shaped item after editing and the width W of the arch-shaped item before editing is expressed by the following equation using the radius r of the arch-shaped item before editing.

Note that the unit of α is degrees (°).

$$|W'' - W| = 2 \times \pi \times r \times \alpha / 360$$

The item height changing unit 44 gets the attribute information for the selected item from among the items stored in the attribute data storage unit 47.

By moving a point Q near either of the two height definition points 75*a* and 75*b* of the arch-shaped item before editing to another point P based on the retrieved attribute information for the item before editing when the extracted item has the disc center setting ON, the item height changing unit 44 generates attribute information for an arch-shaped item having a different height after editing than before editing where the height definition point 75*a* or 75*b* that was not moved and the point P are the height definition points 75'*a* and 75'*b* after editing, and stores the attribute information in the attribute data storage unit 47.

Figure 13:
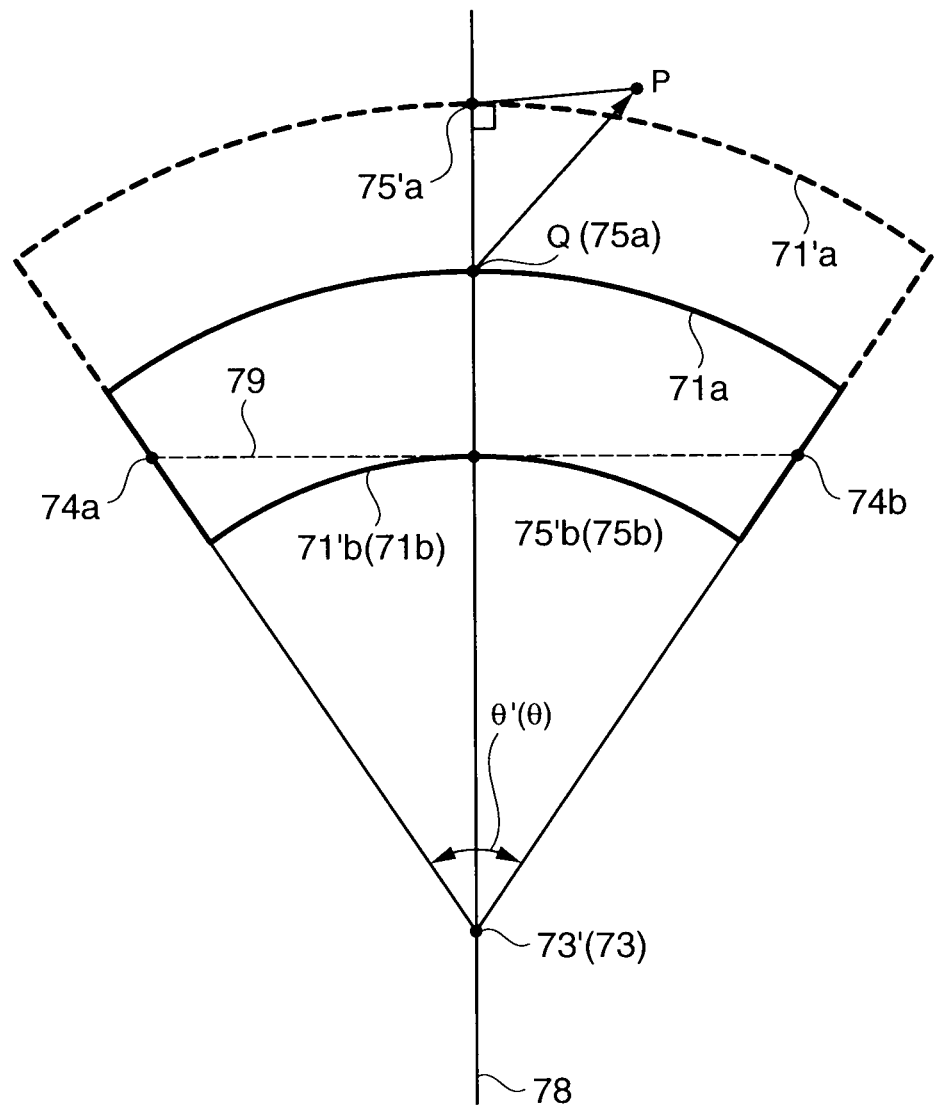

FIG. 13 describes the arch-shaped item generated by the item height changing unit 44.

As shown in FIG. 13, the position of the center point 73 of the arch-shaped item before editing is the position of the center point 73' of the arch-shaped item after editing, and the open angle θ' of the arch-shaped item after editing is the open angle θ of the arch-shaped item before editing.

The height H' of the arch-shaped item after editing is the height H of the arch-shaped item before editing offset by the distance to the point P from a straight line that is parallel to the line segment 79 connecting the two width definition points 74*a* and 74*b* of the item before editing and passes through point Q.

The attribute information for the arch-shaped item after editing is generated so that the arc 71*a* or 71*b* of the item before editing on which the height definition point 75*a* or 75*b* that was not moved was present is an arc 71'*a* or 71'*b* of the item after editing.

The item position changing unit 45 gets the attribute information for the selected item from among the items stored in the attribute data storage unit 47.

By moving the a point Q in an item area not including the two width definition points 74*a* and 74*b* and the two height definition points 75*a* and 75*b* to another point P based on the retrieved attribute information of the item before editing when the disc center setting is ON, the item position changing unit 45 generates attribute information for an arch-shaped item after editing at a different item position than before editing, and stores the attribute information in the disc center setting unit 46.

Figure 14:
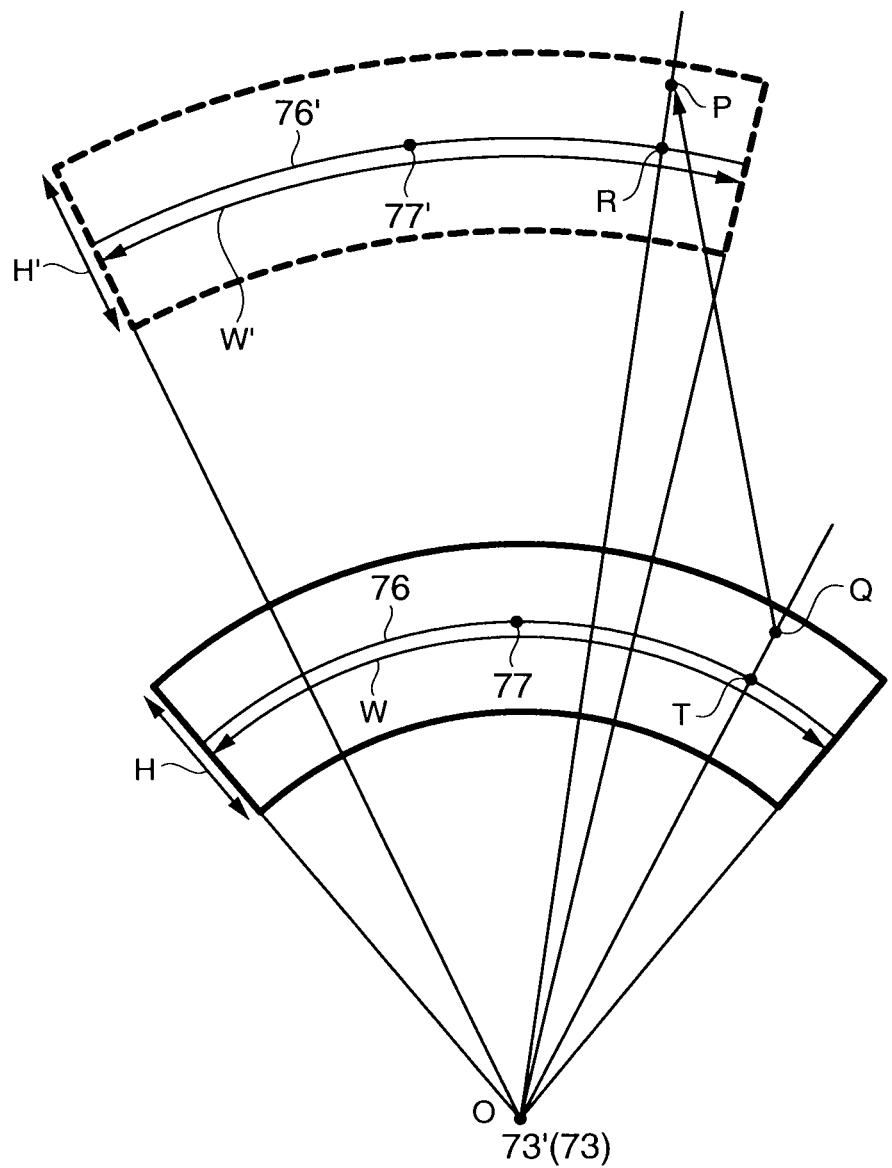

FIG. 14 describes an arch-shaped item generated by the item position changing unit 45.

As shown in FIG. 14, the position of the center point 73 of the arch-shaped item before editing is the center point 73' of the arch-shaped item after editing, the width W of the arch-shaped item before editing is the width W' of the arch-shaped item after editing, and the height H of the arch-shaped item before editing is the height H' of the arch-shaped item after editing.

The distance from a point T to point Q and the distance from a point R to point P are also the same where point T is the intersection of the height center arc 76 of the arch-shaped item before editing and a straight line that originates at the center point 73 of the arch-shaped item before editing and passes through the center point 73 of the arch-shaped item before editing and point Q, and point R is the intersection of the height center arc 76' of the arch-shaped item after editing and a straight line that originates at the center point 73' of the arch-shaped item after editing and passes through the center point 73' arch-shaped item after editing and point P.

In addition, the distance from the midpoint 77 of the arch-shaped item before editing to point T along the height center arc 76 of the arch-shaped item before editing, and the distance from the midpoint 77' of the arch-shaped item after editing to point R along the height center arc 76' of the arch-shaped item after editing, are the same.

An arch-shaped item having the first arch shape is described above, but the same operation applies to a fan shape item.

The invention can be implemented in digital electronic circuitry, or in computer hardware, firmware, software, or in combinations of them. The invention can be implemented in a computer program product tangibly embodied in a machine-readable or computer readable storage device for execution by a programmable processor or computer. Computer readable storage devices may include, for example, diskettes, compact disks (CDs), DVDs, solid-state memory devices, and the like.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A computer-implemented item editing method for editing an editable item within a layout area using an item changing unit and a disc center setting unit in the computer where prescribed areas are set as attributes of the item in a top side, a bottom side, a left side, a right side, a center point, and an internal area other than the center point of the item, the item editing method comprising steps of using the item changing unit of the computer to:

specify one of the prescribed areas of the editable item when editing the item;

specify any point in the layout area as a destination of the specified item; and select one of a plurality of editing units included in the item changing unit according to the specified point and editing the editable item within the layout area, the plurality of editing units including an arch-shape generating unit, an item curvature changing unit, an item width changing unit, an item height changing unit, and an item position changing unit; and wherein the arch-shape generating unit changes a rectangular item that is the editable item to an arch-shaped item when a disc center setting of the disc center setting unit is ON by specifying only two points, a first one of the two points corresponding to a center point definition area in the rectangular item and a second one of the two points being a separate point;

the item curvature changing unit changes a curvature of the editable item when a disc center setting of the disc center setting unit is ON by specifying only two points, a first one of the two points corresponding to a center point definition area in the editable item and a second one of the two points being a separate point;

the item width changing unit changes a width of the editable item by specifying only two points, a first one of the two points corresponding to a width definition area on the left side or the right side of the editable item and a second one of the two points being a separate point;

the item height changing unit changes a height of the editable item by specifying only two points, a first one of the two points corresponding to a height definition area on the top side or the bottom side of the editable item and a second one of the two points being a separate point; and the item position changing unit changes a position of the editable item by specifying only two points, a first one of the two points corresponding to a prescribed area other than the center point of the editable item and a second one of the two points being a separate point.

2. A non-transitory tangible computer-readable medium embodying program instructions executable by the computer, the media including instructions for performing the item editing method of claim 1.

3. A computer-implemented item editing method for editing an editable item within a layout area that is a circle or a part of a circle using an item changing unit and a disc center setting unit in the computer where prescribed areas of a top side, a bottom side, a left side, a right side, a center point, and an internal area other than the center point of the item are set as attributes of the item, the item editing method comprising steps of using the computer to:

set the center of the circle or the part of the circle as a reference point for editing;

specify one of the prescribed areas of the editable item when editing the item;

specify any point in the layout area as a destination of the specified item; and select one of a plurality of editing units included in the item changing unit according to the specified point and editing the editable item within the layout area, the plurality of editing units including an arch-shape generating unit, an item curvature changing unit, an item width changing unit, an item height changing unit, and an item position changing unit; and wherein the arch-shape generating unit changes a rectangular item that is the editable item to an arch-shaped item when a disc center setting of the disc center setting unit is ON by specifying only two points, a first one of the two points corresponding to a center point definition area in the rectangular item and a second one of the two points being a separate point;

the item curvature changing unit changes a curvature of the editable item when a disc center setting of the disc center setting unit is ON by specifying only two points, a first one of the two points corresponding to a center point definition area in the editable item and a second one of the two points being a separate point;

the item width changing unit changes a width of the editable item by specifying only two points, a first one of the two points corresponding to a width definition area on the left side or the right side of the editable item and a second one of the two points being a separate point;

the item height changing unit changes a height of the editable item by specifying only two points, a first one of the two points corresponding to a height definition area on the top side or the bottom side of the editable item and a second one of the two points being a separate point; and the item position changing unit changes a position of the editable item by specifying only two points, a first one of the two points corresponding to a prescribed area other than the center point of the editable item and a second one of the two points being a separate point.

4. A non-transitory tangible computer-readable medium embodying program instructions executable by the computer, the media including instructions for performing the item editing method of claim 3.

5. An item editing device for editing an editable item within a layout area where prescribed areas of a top side, a bottom side, a left side, a right side, a center point, and an internal area other than the center point of the editable item are set as attributes of the editable item, the item editing device comprising a computer that:

specifies one of the prescribed areas of the editable item when editing the editable item and then specifying any point in the layout area as a destination of the specified area of the editable item; and selects generating an arch shape, changing the item curvature, changing the item width, changing the item height, or changing the item position according to the specified prescribed area, and moves the editable item to the destination; and wherein the computer comprises:

a disc center setting unit, and a plurality of editing units including an arch-shape generating unit, an item curvature changing unit, an item width changing unit, an item height changing unit, and an item position changing unit; and wherein the arch-shape generating unit changes a rectangular item that is the editable item to an arch-shaped item when a disc center setting of the disc center setting unit is ON by specifying only two points, a first one of the two points corresponding to a center point definition area in the rectangular item and a second one of the two points being a separate point;

the item curvature changing unit changes a curvature of the editable item when a disc center setting of the disc center setting unit is ON by specifying only two points, a first one of the two points corresponding to a center point definition area in the editable item and a second one of the two points being a separate point;

the item width changing unit changes a width of the editable item by specifying only two points, a first one of the two points corresponding to a width definition area on the left side or the right side of the editable item and a second one of the two points being a separate point;

the item height changing unit changes a height of the editable item by specifying only two points, a first one of the two points corresponding to a height definition area on the top side or the bottom side of the editable item and a second one of the two points being a separate point; and the item position changing unit changes a position of the editable item by specifying only two points, a first one of the two points corresponding to a prescribed area other than the center point of the editable item and a second one of the two points being a separate point.

6. An item editing device for editing an editable item within a layout area, the item editing device comprising a computer that comprises an item changing unit and a disc center setting unit where prescribed areas of a top side, a bottom side, a left side, a right side, a center point, and an interior area other than the center point of the editable item are set as attributes of the editable item, the computer further comprising:

a movement point selection unit that specifies one of the prescribed areas of the editable item when editing the item and then specifies any point in the layout area as a destination of the specified item;

an item moving unit that selects one of a plurality of editing units included in the item changing unit according to the specified prescribed area and moves the editable item to the destination; and a plurality of editing units including an arch-shape generating unit, an item curvature changing unit, an item width changing unit, an item height changing unit, and an item position changing unit; and wherein the arch-shape generating unit changes a rectangular item that is the editable item to an arch-shaped item when a disc center setting of the disc center setting unit is ON by specifying only two points, a first one of the two points corresponding to a center point definition area in the rectangular item and a second one of the two points being a separate point;

the item curvature changing unit changes a curvature of the editable item when a disc center setting of the disc center setting unit is ON by specifying only two points, a first one of the two points corresponding to a center point definition area in the editable item and a second one of the two points being a separate point;

the item width changing unit changes a width of the editable item by specifying only two points, a first one of the two points corresponding to a width definition area on the left side or the right side of the editable item and a second one of the two points being a separate point;

the item height changing unit changes a height of the editable item by specifying only two points, a first one of the two points corresponding to a height definition area on the top side or the bottom side of the editable item and a second one of the two points being a separate point; and the item position changing unit changes a position of the editable item by specifying only two points, a first one of the two points corresponding to a prescribed area other than the center point of the editable item and a second one of the two points being a separate point.

7. An item editing device for editing an editable item within a layout area that is a circle or a part of a circle using an item changing unit and a disc center setting unit where prescribed points on a top side, a bottom side, a left side, and a right side of the editable item, the center point and an internal prescribed point other than the center point of the editable item are set as attributes of the editable item, the item editing device comprising a computer that comprises:

a reference point setting unit that sets the center of the circle or the part of the circle as a reference point for editing;

a movement point selection unit that specifies one of the prescribed areas of the editable item when editing the editable item, and then specifies any point in the layout area as a destination of the editable item; and an item moving unit that selects one of a plurality of editing units included in the item changing unit according to the specified point and edits the editable item centered on the reference point, the plurality of editing units including an arch-shape generating unit, an item curvature changing unit, an item width changing unit, an item height changing unit, and an item position changing unit; and wherein the arch-shape generating unit changes an editable rectangular item to an arch-shaped item centered on the reference point when a disc center setting of the disc center setting unit is ON by specifying only two points, a first one of the two points corresponding to a center point definition area in the rectangular item and a second one of the two points being a separate point;

the item curvature changing unit changes a curvature of an arch-shaped item that is the editable item centered on the reference point when a disc center setting of the disc center setting unit is ON by specifying only two points, a first one of the two points corresponding to a center point definition area of the arch-shaped item and a second one of the two points being a separate point;

the item width changing unit changes a width of an editable arch-shaped item centered on the reference point by specifying only two points, a first one of the two points corresponding to a width definition area on the left side or the right side of the editable arch-shaped item and a second one of the two points being a separate point;

the item height changing unit changes a height of an editable arch-shaped item centered on the reference point by specifying only two points, a first one of the two points corresponding to a height definition area on the top side or the bottom side of the editable item and a second one of the two points being a separate point; and the item position changing unit changes a position of an editable arch-shaped item centered on the reference point by specifying only two points, a first one of the two points corresponding to a prescribed area other than the center point of the arch-shaped item and a second one of the two points being a separate point.

* * * * *